(12) United States Patent
Fujie et al.

(10) Patent No.: US 8,636,814 B2
(45) Date of Patent: Jan. 28, 2014

(54) COMPOUND HAVING XANTHENE STRUCTURE, COLORING COMPOSITION, INK FOR INKJET RECORDING AND INKJET RECORDING METHOD

(71) Applicant: Fujifilm Corporation, Tokyo (JP)

(72) Inventors: Yoshihiko Fujie, Manchester (GB); Keiichi Tateishi, Manchester (GB); Clive Edwin Foster, Manchester (GB)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/898,764

(22) Filed: May 21, 2013

(65) Prior Publication Data

US 2013/0321521 A1    Dec. 5, 2013

(30) Foreign Application Priority Data

May 30, 2012  (JP) .................................. 2012-123188

(51) Int. Cl.
  *C09B 67/10*  (2006.01)
  *C09D 11/00*  (2006.01)

(52) U.S. Cl.
  USPC .................. 8/637.1; 8/624; 8/642; 106/31.47

(58) Field of Classification Search
  USPC .......................... 8/637.1, 624, 642; 106/31.47
  See application file for complete search history.

(56) References Cited

U.S. PATENT DOCUMENTS 5,514,208 A      5/1996  Nagai et al.
2006/0230545 A1*  10/2006  Lagrange .......................... 8/405

FOREIGN PATENT DOCUMENTS

| EP | 1 564 259 A1 | 8/2005 |
|----|--------------|--------|
| GB | 1 503 380 A | 3/1978 |
| JP | 7-179796 A | 7/1995 |
| JP | 9-157562 A | 6/1997 |
| JP | 2005-250000 A | 9/2005 |

OTHER PUBLICATIONS

STIC Search Report dated Sep. 16, 2013.*
Extended European Search Report, dated Oct. 2, 2013, issued by the European Patent Office in counterpart European Patent Application No. 13168962.2.

* cited by examiner

*Primary Examiner* — Eisa Elhilo
(74) *Attorney, Agent, or Firm* — Sughrue Mion, PLLC

(57) ABSTRACT

There is a coloring composition containing a compound represented by Formula (1):

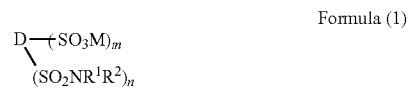

Formula (1)

wherein D, M, N, R1, R2, m and n are defined in the specification and in the claims.

12 Claims, No Drawings

COMPOUND HAVING XANTHENE STRUCTURE, COLORING COMPOSITION, INK FOR INKJET RECORDING AND INKJET RECORDING METHOD

CROSS-REFERENCE TO RELATED APPLICATION(S)

The present application claims priority from Japanese Patent Application No. 2012-123188 filed on May 30, 2012, the entire contents of which are incorporated herein by reference.

BACKGROUND

1. Field

The present invention relates to a compound having a xanthene structure, a coloring composition containing a copper compound, an ink for inkjet recording and an inkjet recording method.

2. Description of the Related Art

An inkjet recording method is a method of printing by dispersing an ink droplet and attaching it to a recording medium such as paper as known in the related art. By this printing method, it is possible to print a high-resolution and high-quality image conveniently at a high speed. In particular, in color printing, a technical development has been recently performed for an image forming method which can replace photographs.

In the case of forming a color image by using an inkjet recording method, it is common to use a yellow ink, a magenta ink, a cyan ink and a black ink. Conventionally, water-based inks have been mainly used as these inkjet inks in terms of safety, such as malodor and hazard associated with fire-fighting. These inks are required to fail within suitable ranges in viscosity, surface tension, and the like, to be excellent in nozzle clogging and storage stability, to impart a recording image at a high concentration, and to be excellent in light fastness, ozone fastness, water fastness and moisture fastness.

Such a performance is mostly satisfied by using a water-based ink containing water or a mixture of water and a water-soluble organic solvent as a main solvent. However, characteristics such as color tone, brightness, light fastness, ozone fastness, water fastness and moisture fastness are influenced considerably by colorants and additives, and various dyes have conventionally been studied.

In a color recording method using a plurality of color inks, uniform characteristics are required to all the constituting ink. Particularly, a magenta dye has a problem in that decolorization by ozone or light (sunlight, fluorescent light and the like) or change in color tone occurs remarkably, compared to other dyes (a cyan dye and a yellow dye). Accordingly, if the ozone fastness or light fastness of the magenta ink is inferior to that of other inks, decolorization of the magenta ink causes the color tone of the whole image of printed matters to be changed, resulting in deteriorating the quality.

Conventionally, an acidic dye having good color strength and high water solubility, such as C. I. Acid Red 52, 249 or 289, is known as a magenta dye for inkjet. However, when such a dye is used alone, clogging of a nozzle hardly occurs due to the high water solubility, but the performances of the ozone fastness, light fastness and moisture fastness are considerably low.

Japanese Patent Application Laid-Open No. H9-157562 (hereinafter JP-A-9-157562) discloses a water-based ink for inkjet recording containing a xanthene derivative colorant having one sulfo group and one sulfonamide group, which is excellent in light fastness.

Further, for a colorant for uses other than an inkjet ink, U.S. Patent Application Laid-Open No. 2006/0230545 (hereinafter US 2006/0230545) discloses a xanthenes derivative having one sulfo group and two sulfonamide groups, or a xanthenes derivative having one carboxyl group and one sulfonyl group having an amino acid group, as a colorant suitably used in a hair dye.

Japanese Patent Application Laid-Open No. 2005-250000 (hereinafter JP-A-2005-250000) and Japanese Patent Application Laid-Open No. H7-179796 (hereinafter JP-A-7-179796) describe a purpose of incorporating a sulfonamide group into a xanthene derivative having one sulfo group, as a colorant suitably used in a toner or a color filter.

However, in JP-A-9-157562, there is no description about a moisture fastness of the ink described therein, which is a performance needed to be used as an inkjet ink. Therefore, there is still room left for review. Also in US 2006/0230545, JP-A-2005-250000, and JP-A-7-179796, there are no description about a purpose of using as the described colorant as an inkjet ink and also about moisture fastness.

An object of the present invention is to provide a compound capable of forming an image which is excellent in moisture fastness as well as hue, print concentration and ozone fastness, a coloring composition containing the compound, an ink for inkjet recording, and an inkjet recording method using the compound.

In order to solve the above-mentioned problems, the present inventors have studied intensively and have found a coloring composition containing a compound represented by Formula (1) as described below. And, the present inventors have found out that it is possible to form an image which is excellent in moisture fastness as well as hue, print concentration and ozone fastness by employing the coloring composition.

That is, the present invention is as follows. Further, in the present specification, "to" indicates a range including the numerical values described before and after "to" as a minimum value and a maximum value, respectively.

SUMMARY (1) A coloring composition containing a compound represented by Formula (1):

Formula (1)

wherein D represents a residue structure in which four hydrogen atoms are removed from the compound represented by Formula (2), $R^1$ and $R^2$ represent $R^1=R^2=H$, or $R^1=R$ and $R^2=$-L-$CO_2M$, R represents a hydrogen atom or a monovalent substituent, and when a plurality of R is present, R's may be the same or different, L represents a divalent linking group, and when a plurality of L is present, L's may be the same or different, M represents a hydrogen atom or a counteraction, and when a plurality of M is present, M's may be the same or different, and n represents the number of 1 to 4, and m represents the number of 0 to 3, provided that m+n is 4:

Formula (2)

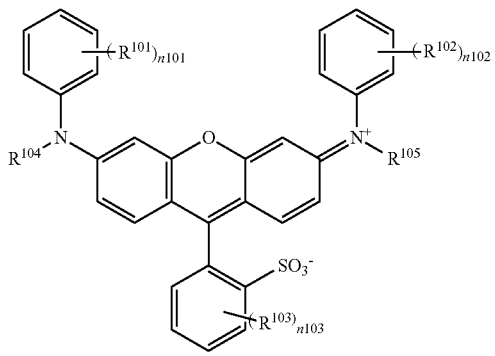

wherein $R^{101}$, $R^{102}$ and $R^{103}$ each independently represent a monovalent substituent, $R^{104}$ and $R^{105}$ each independently represent a hydrogen atom or a monovalent substituent, and $n^{101}$ and $n^{102}$ each independently represent the number of 0 to 5, and $n^{103}$ represents 0 to 4, and when n101, $n^{102}$ and $n^{103}$ each represent the number of 2 or more, a plurality of $R^{101}$ may be the same or different, a plurality of $R^{102}$ may be the same or different, and a plurality of $R^{103}$ may be the same or different (hereinafter, referred to as "each of pluralities of $R^{101}$, $R^{102}$ and $R^{103}$ may be the same or different." This expression may be applied to other numerical references in this specification).

(2) The coloring composition according to (1), wherein the compound represented by Formula (1) is a compound represented by the following Formula (3):

Formula (3)

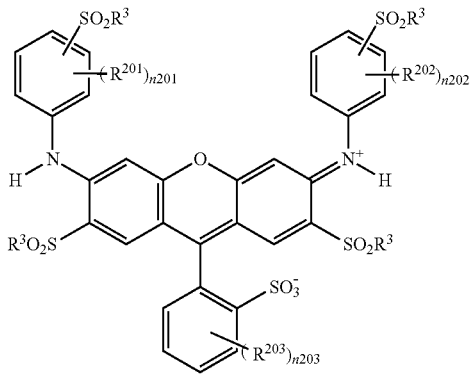

wherein when $R^1$ and $R^2$ are $R^1$=$R^2$=H, $R^3$'s each independently represent OM or $NH_2$, provided that, when $R^1$ and $R^2$ are $R^1$=$R^2$=H, at least one of $R^3$'s represent $NH_2$, when $R^1$ and $R^2$ are $R^1$=R and $R^2$=-L-$CO_2$M, $R^3$'s each independently represent OM or NR-L-$CO_2$M, provided that when $R^1$ and $R^2$ are $R^1$=R and $R^2$=-L-$CO_2$M, at least one of $R^3$'s represent NR-L-$CO_2$M, R represents a hydrogen atom or a monovalent substituent, and when a plurality of R is present, R's may be the same or different, L represents a divalent linking group, and when a plurality of L is present, L's may be the same or different, $R^{201}$, $R^{202}$ and $R^{203}$ each independently represent a monovalent substituent, n201 and n202 each independently represent the number of 0 to 4, n203 represents the number of 0 to 4, and when n201, n202 and n203 each represent the number of 2 or more, each of pluralities of $R^{201}$, $R^{202}$ and $R^{203}$ may be the same or different, and M represents a hydrogen atom or a counteraction, and when a plurality of M is present, M's may be the same or different.

(3) The coloring composition according to (1) or (2), wherein $R^{101}$, $R^{102}$, $R^{103}$, $R^{201}$, $R^{202}$ and $R^{203}$ each independently represent an alkyl group or an acylamino group.

(4) The coloring composition according to any one of (1) to (3), wherein $R^{101}$, $R^{102}$, $R^{103}$, $R^{201}$, $R^{202}$ and $R^{203}$ each independently represent an alkyl group having 1 to 6 carbon atoms.

(5) The coloring composition according to any one of (1) to (4), wherein n101, n102, n201 n202 each independently represent the number of 2 to 4.

(6) The coloring composition according to any one of (1) to (5), wherein n103 and n203 represent 0.

(7) The coloring composition according to any one of (1) to (6), wherein M is a lithium ion, a sodium ion or a potassium ion.

(8) The coloring composition according to any one of (1) to (7), wherein the compound represented by Formula (1) is contained in an amount of 1% by mass to 20% by mass.

(9) An ink for inkjet recording including the coloring composition according to any one of (1) to (8).

(10) An inkjet recording method including forming an image by using the coloring composition according to any one of (1) to (8) or the ink for inkjet recording according to (9).

(11) A compound represented by Formula (1):

Formula (1)

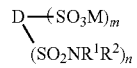

wherein D represents a residue structure in which four hydrogen atoms are removed from the compound represented by Formula (2), $R^1$ and $R^2$ represent $R^1$=$R^2$=H, or $R^1$=R and $R^2$=-L-$CO_2$M, R represents a hydrogen atom or a monovalent substituent, and when a plurality of R is present, R's may be the same or different, L represents a divalent linking group, and when a plurality of L is present, L's may be the same or different, M represents a hydrogen atom or a counteraction, and when a plurality of M is present, M's may be the same or different, and n represents the number of 1 to 4, and m represents the number of 0 to 3, provided that m+n is 4:

Formula (2)

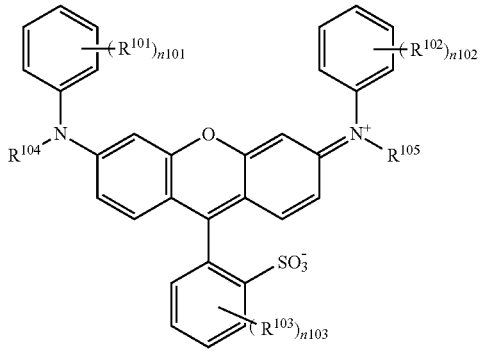

wherein $R^{101}$, $R^{102}$ and $R^{103}$ each independently represent a monovalent substituent, $R^{104}$ and $R^{105}$ each independently represent a hydrogen atom or a monovalent substituent, and $n^{101}$ and $n^{102}$ each independently represent the number of 0 to 5, and $n^{103}$ represents 0 to 4 and when $n^{101}$, $n^{102}$ and $n^{103}$ each represent the number of 2 or more, each of pluralities of $R^{101}$, $R^{102}$ and $R^{103}$ may be the same or different.

According to the present invention, there are provided a compound capable of forming an image which is excellent in moisture fastness as well as hue, print concentration and ozone fastness, a coloring composition containing the compound, an ink for inkjet recording, and an inkjet recording method using the compound.

Hereinafter, the present invention will be described in detail.

First, in the present invention, Group A of substituents will be defined.

(Group A of Substituents)

Examples may include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imide group, a phosphino group, a phosphinyl group, a phosphinyloxy group, a phosphinylamino group, a silyl group and an ionic hydrophilic group. These substituents may be further substituted, and the further substituent may be exemplified by Group A of substituents as described above.

Examples of the halogen atom may include a fluorine atom, a chlorine atom, a bromine atom or an iodine atom.

Examples of the alkyl group may include a straight, branched or cyclic, substituted or unsubstituted alkyl group, including a cycloalkyl group, a bicycloalkyl group and a tricycle structure which has more cyclic structures. The alkyl group (for example, an alkyl group in an alkoxy group or an alkylthio group) in substituents as described below also represents an alkyl group of such a concept.

Examples of the alkyl group may include preferably an alkyl group having 1 to 30 carbon atoms, such as a methyl group, an ethyl group, an n-propyl group, an i-propyl group, a t-butyl group, a n-octyl group, an eicosyl group, a 2-chloroethyl group, 2-cyanoethyl group and a 2-ethylhexyl group. Examples of the cycloalkyl group may include preferably a substituted or unsubstituted cycloalkyl group having 3 to 30 carbon atoms, such as a cyclohexyl group, a cyclopentyl group and a 4-n-dodecylcyclohexyl group. Examples of the bicycloalkyl group may include preferably a substituted or unsubstituted bicycloalkyl group having 5 to 30 carbon atoms, that is, a monovalent group in which one hydrogen atom is removed from a bicyloalkane having 5 to 30 carbon atoms, such as a bicyclo[1,2,2]heptan-2-yl group and a bicyclo[2,2,2]octan-3-yl group.

Examples of the aralkyl group may include a substituted or unsubstituted aralkyl group, and examples of the substituted or unsubstituted aralkyl group may include preferably an aralkyl group having 7 to 30 carbon atoms. Examples thereof may include a benzyl group and a 2-phenethyl group.

Examples of the alkenyl group may include a straight, branched or cyclic, substituted or unsubstituted alkenyl group, including a cycloalkenyl group and a bicycloalkenyl group.

Examples of the alkenyl group may include a substituted or unsubstituted alkenyl group having 2 to 30 carbon atoms, such as a vinyl group, an allyl group, a prenyl group, a geranyl group and an oleyl group. Examples of the cycloalkenyl group may include preferably a substituted or unsubstituted cycloalkenyl group having 3 to 30 carobn atoms, that is, a monovalent group in which one hydrogen atom is removed from a cycloalkene having 3 to 30 carbon atoms, such as a 2-cyclopenten-1-yl group and a 2-cyclohexen-1-yl group.

Examples of the bicycloalkenyl group may include a substituted or unsubstituted bicycloalkenyl group, preferably a substituted or unsubstituted bicycloalkenyl group having 5 to 30 carbon atoms, that is, a monovalent group in which one hydrogen atom is removed from a bicycloakene having one double bond, such as a bicyclo[2,2,1]hept-2-en-1-yl group and a bicyclo[2,2,2]oct-2-en-4-yl group.

Examples of the alkynyl group may include preferably a substituted or unsubstituted alkynyl group having 2 to 30 carbon atoms, such as an ethynyl group, a propargyl group and a trimethylsilylethynyl group.

Examples of the aryl group may include preferably a substituted or unsubstituted aryl group having 6 to 30 carbon atoms, such as a phenyl group, a p-tolyl group, a naphthyl group, a m-chlorophenyl group and an o-hexadecanoylaminophenyl group.

Examples of the heterocyclic group may include preferably a monovalent group in which one hydrogen atom is removed from a 5- or 6-membered substituted or unsubstituted aromatic or non-aromatic hetrocyclic compound, more preferably a 5- or 6-membered aromatic heterocyclic group having 3 to 30 carbon atoms, such as a 2-furyl group, a 2-thienyl group, a 2-pyrimidinyl group and a 2-benzothiazolyl group.

Examples of the alkoxy group may include a substituted or unsubstituted alkoxy group having 1 to 30 carbon atoms, such as a methoxy group, an ethoxy group, an isopropoxy group, a t-butoxy group, an n-octyloxy group and a 2-methoxyethoxy group.

Examples of the aryloxy group may include preferably a substituted or unsubstituted aryloxy group having 6 to 30 carbon atoms, such as a phenoxy group, a 2-methylphenoxy group, a 4-t-butylphenoxy group, a 3-nitrophenoxy group and a 2-tetradecanoylaminophenoxy group.

Examples of the silyloxy group may include preferably a substituted or unsubstituted silyloxy group having 0 to 20 carbon atoms, such as a trimethylsilyloxy group and a diphenylmethylsilyloxy group.

Examples of the heterocyclic oxy group may include preferably a substituted or unsubstituted heterocyclic oxy group having 2 to 30 carbon atoms, such as a 1-phenyltetrazol-5-oxy group and a 2-tetrahydropyranyloxy group.

Examples of the acyloxy group may include preferably a formyloxy group, a substituted or unsubstituted alkylcarbonyloxy group having 2 to 30 carbon atoms and a substituted or unsubstituted arylcarbonyloxy group having 6 to 30 carbon atoms, such as an acetyloxy group, a pivaloyloxy group, a stearoyloxy group, a benzoyloxy group and a p-methoxyphenylcarbonyloxy group.

Examples of the carbamoyloxy group may include preferably a substituted or unsubstituted carbamoyloxy group having 1 to 30 carbon atoms, such as an N,N-dimethylcarbamoyloxy group, an N,N-diethylcarbamoyloxy group, a morpholinocarbonyloxy group, an N,N-di-n-octylaminocarbonyloxy group and an N-n-octylcarbamoyloxy group.

Examples of the alkoxycarbonyloxy group may include preferably a substituted or unsubstituted alkoxycarbonyloxy group having 2 to 30 carbon atoms, such as a methoxycarbonyloxy group, an ethoxycarbonyloxy group, a t-butoxycarbonyloxy group and a n-octylcarbonyloxy group.

Examples of the aryloxycarbonyloxy group may include preferably a substituted or unsubstituted aryloxycarbonyloxy group having 7 to 30 carbon atoms, such as a phenoxycarbonyloxy group, a p-methoxyphenoxycarbonyloxy group and a p-n-hexadecyloxyphenoxycarbonyloxy group.

Examples of the amino group may include an alkylamino group, an arylamino group and a heterocyclic amino group, preferably an amino group, a substituted or unsubstituted alkylamino group having 1 to 30 carbon atoms and a substituted or unsubstituted anilino group having 6 to 30 carbon atoms, such as a methylamino group, a dimethylamino group, an anilino group, an N-methyl-anilino group, a diphenylamino group and a triazinylamino group.

Examples of the acylamino group may include preferably a formylamino group, a substituted or unsubstituted alkylcarbonylamino group having 1 to 30 carbon atoms and a substituted or unsubstituted arylcarbonylamino group having 6 to 30 carbon atoms, such as an acetylamino group, a pivaloylamino group, a lauroylamino group, a benzoylamino group and a 3,4,5-tri-n-octyloxyphenylcarbonylamino group.

Examples of the aminocarbonylamino group may include preferably a substituted or unsubstituted aminocarbonylamino group having 1 to 30 carbon atoms, such as a carbamoyl amino group, an N,N-dimethylaminocarbonylamino group, an N,N-diethylaminocarbonylamino group and a morpholinocarbonylamino group.

Examples of the alkoxycarbonylamino group may include preferably a substituted or unsubstituted alkoxycarbonylamino group having 2 to 30 carbon atoms, such as a methoxycarbonylamino group, an ethoxycarbonylamino group, a t-butoxycarbonylamino group, a n-octadecyloxycarbonylamino group and an N-methyl-methoxycarbonylamino group.

Examples of the aryloxycarbonylamino group may include preferably a substituted or unsubstituted aryloxycarbonylamino group having 7 to 30 carbon atoms, such as a phenoxycarbonylamino group, a p-chlorophenoxycarbonylamino group and a m-n-octyloxyphenoxycarbonylamino group.

Examples of the sulfamoylamino group may include preferably a substituted or unsubstituted sulfamoylamino group having 0 to 30 carbon atoms, such as a sulfamoylamino group, an N,N-dimethylaminosulfonylamino group and an N-n-octylaminosulfonylamino group.

Examples of the alkyl- or arylsulfonylamino group may include a substituted or unsubstituted alkylsulfonylamino group having 1 to 30 carbon atoms and a substituted or unsubstituted arylsulfonylamino group having 6 to 30 carbon atoms, such as a methylsulfonylamino group, a butylsulfonylamino group, a phenylsulfonylamino group, a 2,3,5-trichlorophenylsulfonylamino group and a p-methylphenylsulfonylamino group.

Examples of the alkylthio group may include preferably a substituted or unsubstituted alkylthio group having 1 to 30 carbon atoms, such as a methylthio group, an ethylthio group and a n-hexadecylthio group.

Examples of the arylthio group may include preferably a substituted or unsubstituted arylthio group having 6 to 30 carbon atoms, such as a phenylthio group, a p-chlorophenylthio group and a m-methoxyphenylthio group.

Examples of the heterocyclic thio group may include preferably a substituted or unsubstituted heterocyclic thio group having 2 to 30 carbon atoms, such as a 2-benzothiazolylthio group and a 1-phenyltetrazol-5-ylthio group.

Examples of the sulfamoyl group may include preferably a substituted or unsubstituted sulfamoyl group having 0 to 30 carbon atoms, such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group and an N—(N'-phenylcarbamoyl)sulfamoyl group.

Exmples of the alkyl- or arylsulfinyl group may include preferably a substituted or unsubstituted alkylsulfinyl group having 1 to 30 carbon atoms and a substituted or unsubstituted arylsulfinyl group having 6 to 30 carbon atoms, such as a methylsulfinyl group, an ethylsulfinyl group, a phenylsulfinyl group and a p-methylphenylsulfinyl group.

Examples of the alkyl- or arylsulfonyl group may include preferably a substituted or unsubstituted alkylsulfonyl group having 1 to 30 carbon atoms and a substituted or unsubstituted arylsulfonyl group having 6 to 30 carbon atoms, such as a methylsulfonyl group, an ethylsulfonyl group, a phenylsulfonyl group and a p-methylphenylsulfonyl group.

Examples of the acyl group may include preferably a formyl group, a substituted or unsubstituted alkylcarbonyl group having 2 to 30 carbon atoms, a substituted or unsubstituted arylcarbonyl group having 7 to 30 carbon atoms, a substituted or unsubstituted heterocyclic carbonyl group having 2 to 30 carbon atoms which is bound via a carbon atom to a carbonyl group, such as an acetyl group, a pivaloyl group, a 2-chloroacetyl group, a stearoyl group, a benzoyl group, a p-n-octyloxyphenylcarbonyl group, a 2-pyridylcarbonyl group and a 2-furylcarbonyl group.

Examples of the aryloxycarbonyl group may include preferably a substituted or unsubstituted aryloxycarbonyl group having 7 to 30 carbon atoms, such as a phenoxycarbonyl group, an o-chlorophenoxycarbonyl group, a m-nitrophenoxycarbonyl group and a p-t-butylphenoxycarbonyl group.

Examples of the alkoxycarbonyl group may include preferably a substituted or unsubstituted alkoxycarbonyl group having 2 to 30 carbon atoms, such as a methoxycarbonyl group, an ethoxycarbonyl group, a t-butoxycarbonyl group and a n-octadecyloxycarbonyl group.

Examples of the carbamoyl group may include preferably a substituted or unsubstituted carbamoyl group having 1 to 30 carbon atoms, such as a carbamoyl group, an N-methylcarbamoyl group, an N,N-dimethylcarbamoyl group, an N,N-di-n-octylcarbamoyl group and an N-(methylsulfonyl)carbamoyl group.

Examples of the aryl- or heterocyclic azo group may include preferably a substituted or unsubstituted arylazo group having 6 to 30 carbon atoms and a substituted or unsubstituted heterocyclic azo group having 3 to 30 carbon atoms, such as phenylazo, p-chlorophenylazo and 5-ethylthio-1,3,4-thiadiazol-2-ylazo.

Examples of the imide group may include preferably an N-succinimide group and an N-phthalimide group.

Examples of the phosphino group may include preferably a substituted or unsubstituted phosphino group having 0 to 30 carbon atoms, such as a dimethylphosphino group, a diphenylphosphino group and a methylphenoxyphosphino group.

Examples of the phosphinyl group may include preferably a substituted or unsubstituted phosphinyl group having 0 to 30 carbon atoms, such as a phosphinyl group, a dioctyloxyphosphinyl group and a diethoxyphosphinyl group.

Examples of the phosphinyloxy group may include preferably a substituted or unsubstituted phosphinyloxy group having 0 to 30 carbon atoms, such as a diphenoxyphosphinyloxy group and a dioctyloxyphosphinyloxy group.

Examples of the phosphinylamino group may include preferably a substituted or unsubstituted phosphinylamino group having 0 to 30 carbon atoms, such as a dimethoxyphosphinylamino group and a dimethylaminophosphinylamino group.

Examples of the silyl group may include preferably a substituted or unsubstituted silyl group having 0 to 30 carbon atoms, such as a trimethylsilyl group, a t-butyldimethylsilyl group and a phenyldimethylsilyl group.

Examples of the ionic hydrophilic group may include a sulfo group, a carboxyl grup, a thiocarboxyl group, a sulfino group, a phosphono group, a dihydroxyphosphino group, a quaternary ammonium group and the like. The ionic hydrophilic group is particularly preferably a sulfo group or a carboxyl group. Further, the carboxyl group, the phosphono group and the sulfo group may be in a form of a salt, and the paired cation which forms a salt includes an ammonium ion, an alkali metal ion (for example, a lithium ion, a sodium ion and a potassium ion) and an organic cation (for example, a tetramethylammonium ion, a tetramethylguanidium ion and tetramethylphosphonium), and is preferably a lithium salt, a sodium salt, a potassium salt or an ammonium salt, more preferably a sodium salt or a mixture salt containing a sodium salt being main component, and most preferably a sodium salt.

Further, in the present invention, when the compound is a salt, the salt is dissociated in a water soluble ink, and is present as ions.

[Coloring Composition]

The present invention relates to a coloring composition containing the compound represented by the following Formula (1).

Formula (1)

In Formula (1), D represents a residue structure in which four hydrogen atoms are removed from the compound represented by the following Formula (2).

$R^1$ and $R^2$ represent $R^1=R^2=H$, or $R^1=R$ and $R^2=-L-CO_2M$.

R represents a hydrogen atom or a monovalent substituent. When a plurality of R is present, R's may be the same or different.

L represents a divalent linking group. When a plurality of L is present, L's may be the same or different.

M represents a hydrogen atom or a countercation. When a plurality of M is present, M's may be the same or different.

n represents the number of 1 to 4, and m represents the number of 0 to 3, provided that m+n is 4.

Formula (2)

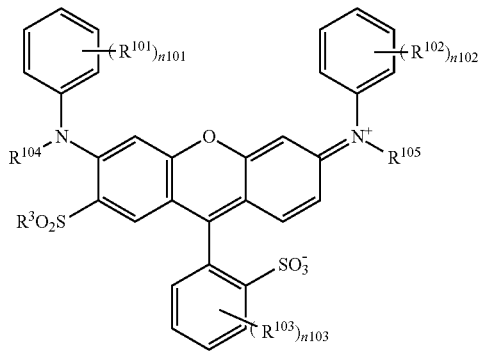

In Formula (2), $R^{101}$, $R^{102}$ and $R^{103}$ each independently represent a monovalent substituent, $R^{104}$ and $R^{105}$ each independently represent a hydrogen atom or a monovalent substituent, $n^{101}$ and $n^{102}$ each independently represent a number of 0 to 5, and $n^{103}$ represents 0 to 4. When $n^{101}$, $n^{102}$ and $n^{103}$ each represents the number of 2 or more, each of pluralities of $R^{101}$, $R^{102}$ and $R^{103}$ may be the same or different.

(Compound Represented by Formula (1))

Hereinafter, the compound represented by Formula (1) will be described.

In Formula (1), D represents a residue structure in which four hydrogen atoms are removed in the compound represented by Formula (2).

In Formula (1), $R^1$ and $R^2$ represent $R^1=R^2=H$, or $R^1=R$ and $R^2=-L-CO_2M$.

In Formula (1), n represents a number of 1 to 4, and m represents the number of 0 to 3, provided that m+n is 4.

That is, the compound represented by Formula (1) is a xanthene dye in which four hydrogen atoms are substituted by sulfonamide groups or by sulfonamide groups and sulfo groups in the compound represented by Formula (2), or a xanthene dye which is substituted with substituted sulfonamide groups or with substituted sulfonamide groups and sulfo groups.

It is considered that the dye represented by Formula (1) is excellent in hue, and is especially excellent in ozone fastness due to the electron-withdrawing property possessed by the sulfo groups.

Further, in the case of $R^1=R^2=H$, it is assumed that the possession of a sulfonamide group causes a hydrogen bonding between the sulfonamide group and a hydroxyl group possessed by silica or alumina present on the printing medium, resulting in a dye having an excellent moisture fastness. Also in the case of $R^1=R$ and $R^2=-L-CO_2M$, although its detailed mechanism is not clear, a dye having an excellent moisture fastness is obtained as well.

Further, in the compound represented by Formula (1) of the present invention, the sum of $SO_2NR^1R^2$ and sulfo groups is 5. As a result, it is possible to combine sufficient moisture fastness with sufficient water solubility. Although the solubility by sulfo groups and the mechanism of the moisture fastness as described above by $SO_2NR^1R^2$ are assumed, if the sum of $SO_2NR^1R^2$ and sulfo groups is 3 or less as in the related art, there is a problem that it is impossible to balance the water solubility and the moisture fastness.

Further, by setting the sum of $SO_2NR^1R^2$ and sulfo groups to 5 from the viewpoint of combining the water solubility with the moisture fastness, remarkably excellent ozone fastness is obtained. Although the mechanism is not clear, it would be because the sulfo groups and $SO_2NR^1R^2$ act as electron-withdrawing groups to considerably delay the oxidation reaction of the dye.

R represents a hydrogen atom or a monovalent substituent. Examples of the monovalent substituent represented by R may include an alkyl group or an aryl group.

When R represents a monovalent substituent, the monovalent substituents preferably an alkyl group, a phenyl group or a naphthyl group, more preferably an alkyl group or a phenyl group, and still more preferably an alkyl group.

When R represents an alkyl group, the alkyl group is preferably an alkyl group having 1 to 6 carbon atoms, more preferably an alkyl group having 1 to 3 carbon atoms, and still more preferably a methyl group.

The monovalent substituent may have a substituent, and examples of the substituent may include a halogen atom, an alkoxy group, an aryloxy group and the like.

The monovalent substituent is preferably unsubstituted.

R is preferably a hydrogen atom or an unsubstituted alkyl group, and more preferably a hydrogen atom or a methyl group. When a plurality of R is present, R's may be the same or different.

L represents a divalent linking group. Examples of the divalent linking group represented by L may include an alkylene group, a phenylene group, a naphthylene group and the like. From the viewpoint of the availability of raw materials and the material price, L is preferably an alkylene group or a phenylene group, more preferably an alkylene group or an unsubstituted phenylene group, and still more preferably an alkylene group.

When L represents an alkylene group, the alkylene group is preferably an alkylene group having 1 to 6 carbon atoms, more preferably a methylene group, an ethylene group or a propylene group, and still more preferably a methylene group or an ethylene group.

The divalent linking group may have a substituent, and examples of the substituent may include a hydroxyl group, a halogen atom, an alkoxy group, an aryloxy group and the like.

The divalent linking group is preferably unsubstituted.

When a plurality of L is present, L's may be the same or different.

n represents the number of 1 to 4, and m represents the number of 0 to 3, provided that m+n is 4.

When $R^1$ and $R^2$ are $R^1=R^2=H$, n is preferably 1 to 3, and more preferably 2 from the viewpoint of the moisture fastness and the water solubility of the dye.

When $R^1$ and $R^2$ are $R^1=R$ and $R^2=-L-CO_2M$, n is preferably 1 to 3, and more preferably 2 from the viewpoint of the moisture fastness and the water solubility of the dye.

In Formula (2), $R^{101}$, $R^{102}$ and $R^{103}$ each independently represent a monovalent substituent.

Examples of the monovalent substituent represented by $R^{101}$, $R^{102}$ and $R^{103}$ may include substitutents selected from Group A of substituents, and from the viewpoint of the availability of raw materials and the material price, the monovalent substituent is preferably a halogen atom, an aryl group, an alkoxy group, an alkyl group or an acylamino group, more preferably an alkyl group or an acylamino group, and still more preferably an allyl group.

When $R^{101}$, $R^{102}$ and $R^{103}$ represent an alkyl group, the alkyl group is preferably an alkyl group having 1 to 6 carbon atoms, and more preferably an alkyl group having 1 to 3 carbon atoms from the viewpoint of the availability of raw materials. Further, the alkyl group is preferably a straight or branched alkyl group. Specific examples of the alkyl group may include a methyl group, an ethyl group, a n-propyl group, an i-propyl group, a t-butyl group and the like, and the alkyl group is preferably a methyl group, an ethyl group or an i-propyl group, more preferably a methyl group or an ethyl group, and still more preferably a methyl group.

The alkyl group may have a substituent, and examples of the substituent may include a halogen atom, a hydroxyl group and the like.

The alkyl group is preferably an unsubstituted alkyl group.

When $R^{101}$, $R^{102}$ and $R^{103}$ represent an acylamino group, the acyl group in the acylamino group is preferably an aliphatic acyl group, and more preferably an aliphatic acyl group having 2 to 6 carbon atoms from the viewpoint of the availability of raw materials and the color strength. Specific examples thereof may include an acetylamino group, propionylamino group, butyrylamino group and the like, and particularly preferably an acetylamino group.

The acylamino group is preferably a monoacylamino group.

In Formula (2), $R^{104}$ and $R^{105}$ each independently represent a hydrogen atom or a monovalent substituent group.

When $R^{104}$ and $R^{105}$ represent a monovalent substituent, examples of the monosubstituent may include substituents selected from Group A of substituents, and the monovalent substituent is preferably a substituent or unsubstituent alkyl group and more preferably an unsubstituent alkyl group.

From the viewpoint of the absorption characteristic and ozone fastness, $R^{104}$ and $R^{105}$ are preferably a hydrogen atom.

In Formula (2), n101 and n102 each independently represent the number of 0 to 5. From the viewpoint of the availability of raw materials and the ease of synthesis, n101 and n102 is preferably the number of 1 to 5, more preferably 2 to 5, still more preferably 2 to 4, and particularly 2 or 3.

When n101 and n102 each represent the number of 2 or more, each of pluralities of $R^{101}$ and $R^{102}$ may be the same or different.

In Formula (2), n103 represents the number of 0 to 4. From the viewpoint of the availability of raw materials, n103 is preferably a number of 0 to 3, more preferably 0 to 2, still more preferably 0 or 1, and particularly preferably 0.

When n103 represents the number of 2 or more, $R^{103}$'s may be the same or different.

In Formula (1), M represents a hydrogen atom or a countercation. When a plurality of M are present, M's may be the same or different.

In Formula (1), when M is a hydrogen atom, it is in a form of free acid, and when M is a countercation, it is in a form of a salt.

The countercation forming a salt may be exemplified by a monovalent countercation, and preferably an alkali metal ion, an ammonium ion, an organic cation and the like.

Examples of the organic cation may include a tetramethylammonium ion, a tetramethylguanidium ion, a tetramethylphosphohonium ion and the like.

From the viewpoint of the availability of raw materials, the water solubility of the dye, and the suppression of gloss generation when forming a secondary color with other dyes in a case of using as an inkjet ink, the countercation is preferably an alkali metal ion, and more preferably a lithium ion, a sodium ion or a potassium ion. Particularly, a sodium ion is preferred because it is inexpensive.

In the present invention, the compound represented by Formula (1) is preferably in a form of a salt, more preferably a lithium salt, a sodium salt or a potassium salt, and still more preferably a sodium salt from the viewpoint of the ease of synthesis (ease of handling as dye powder).

In Formula (1), when a plurality of M are present, each M may be the same or different. That is, the compound represented by Formula (1) in a form of a salt includes a case where all sulfo groups are salts, and a case where some sulfo groups are in a form of free acid and some sulfo groups are salts. Further, the countercation forming a salt may be present either alone or in plurality.

In the present invention, the compound represented by Formula (1) is preferably in a form of a salt, and more preferably a case where all sulfo groups are salts from the viewpoint of the ease of synthesis (ease of handling as dye powder).

The compound represented by Formula (1) is preferably a compound represented by Formula (3).

It is considered that the compound represented by Formula (3) is particularly excellent from the viewpoint of the ozone fastness because it is possible to suppress oxidative gas (oxygen or ozone) from attacking a nitrogen atom by the steric hindrance of a sulfo group introduced in the vicinity of the nitrogen atom.

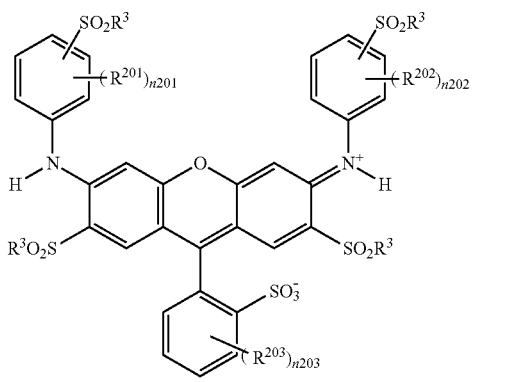

Formula (3)

In Formula (3),

When $R^1$ and $R^2$ are $R^1=R^2=H$, $R^3$'s each independently represent OM or $NH_2$, provided that when $R^1$ and $R^2$ are $R^1=R^2=H$, at least one of $R^3$'s represent $NH_2$.

When $R^1$ and $R^2$ are $R^1=R$ and $R^2=$-L-$CO_2M$, $R^3$'s each independently represent OM or NR-L-$CO_2M$, provided that when $R^1$ and $R^2$ are $R^1=R$ and $R^2=$-L-$CO_2M$, at least one of $R^3$'s represent NR-L-$CO_2M$.

R represents a hydrogen atom or a monovalent substituent. When a plurality of R is present, R's may be the same or different.

L represents a divalent linking group. When a plurality of L is present, L's may be the same or different.

$R^{201}$, $R^{202}$ and $R^{203}$ each independently represent a monovalent substituent.

n201 and n202 each independently represent the number of 0 to 4, and n203 represents the number of 0 to 4.

When n201, n202 and n203 each represent the number of 2 or more, each of pluralities of $R^{201}$, $R^{202}$ and $R^{203}$ may be the same or different.

M represents a hydrogen atom or a countercation. When a plurality of M is present, M's may be the same or different.

In Formula (3), when $R^1$ and $R^2$ are $R^1=R^2=H$, $R^3$'s each independently represent OM or $NH_2$, provided that when $R^1$ and $R^2$ are $R^1=R^2=H$, at least one of $R^3$'s represent $NH_2$.

From the viewpoint of the moisture fastness and the water solubility of the dye, it is preferred that one to three of $R^3$'s are $NH_2$, and it is more preferred that two of $R^3$'s are $NH_2$.

When $R^1$ and $R^2$ are $R^1=R$ and $R^2=$-L-$CO_2M$, $R^3$'s each independently represent OM or NR-L-$CO_2M$, provided that when $R^1$ and $R^2$ are $R^1=R$ and $R^2=$-L-$CO_2M$, at least one of $R^3$'s represent NR-L-$CO_2M$.

From the viewpoint of the moisture fastness and the water solubility of the dye, it is preferred that one to three of $R^3$'s are NR-L-$CO_2M$, and it is more preferred that two of $R^3$'s are NR-L-$CO_2M$.

Specific examples and preferred ranges of R and L in NR-L-$CO_2M$ represented by $R^3$ are the same as the specific examples and preferred ranges of R and L in $R^1$ or $R^2$.

Specific examples and preferred ranges of $R^{201}$, $R^{202}$, $R^{203}$, n203 and M in Formula (3), are the same as the specific examples and preferred ranges of $R^{101}$, $R^{102}$, $R^{103}$, n103 and M in Formula (2).

n201 and n202 in Formula (3) each independently represent the number of 0 to 4, and from the viewpoint of the availability of raw materials and the ease of synthesis, preferably the number of 1 to 4, more preferably the number of 2 to 4, and still more preferably the number of 2 or 3.

Specific examples of the compound represented by Formula (1) are shown below, but the compound is not limited thereto. Further, in the following specific examples, Me denotes a methyl group, Et denotes an ethyl group, i-PR denotes an isopropyl group, t-Bu denotes a tertiary butyl (tert-butyl) group, and Ac denotes an acetyl group.

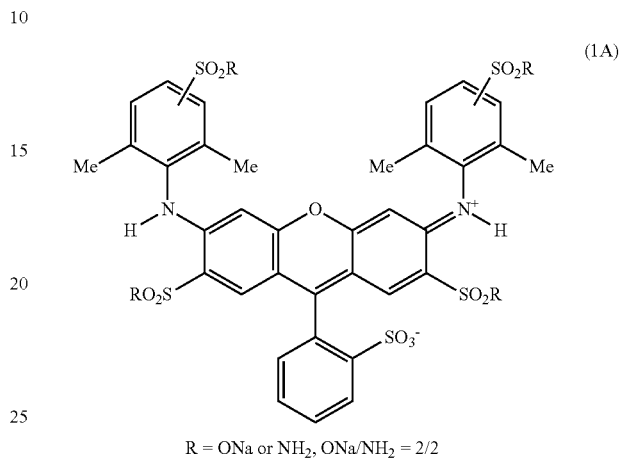

(1A)

R = ONa or $NH_2$, ONa/$NH_2$ = 2/2

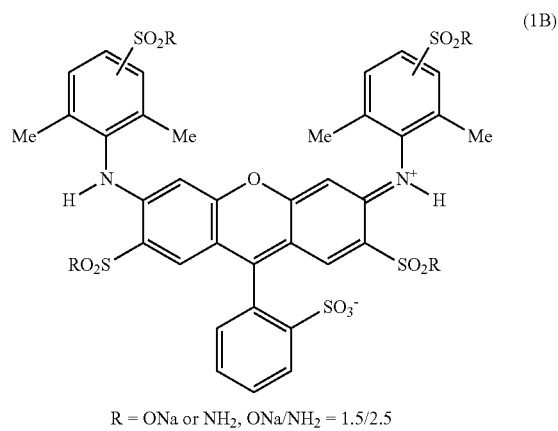

(1B)

R = ONa or $NH_2$, ONa/$NH_2$ = 1.5/2.5

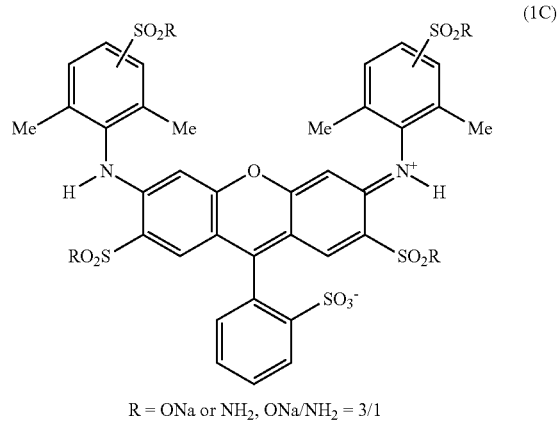

(1C)

R = ONa or $NH_2$, ONa/$NH_2$ = 3/1

-continued
(1D)
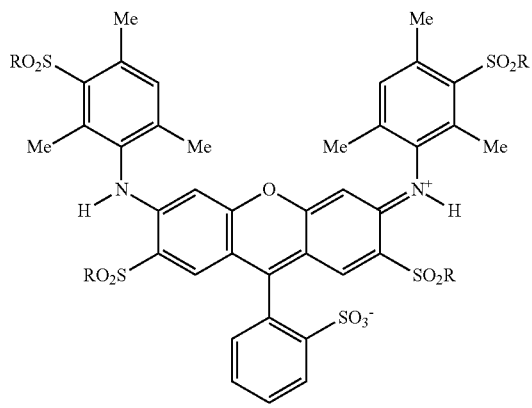
R = ONa or NH₂, ONa/NH₂ = 1/3
(1G)
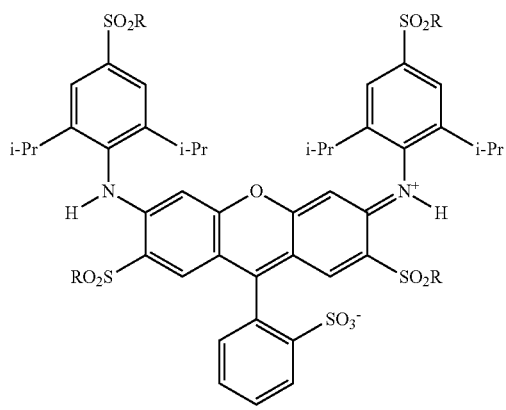
R = ONa or NH₂, ONa/NH₂ = 2/2
(1E)
R = ONa or NH₂, ONa/NH₂ = 2/2
(1H)
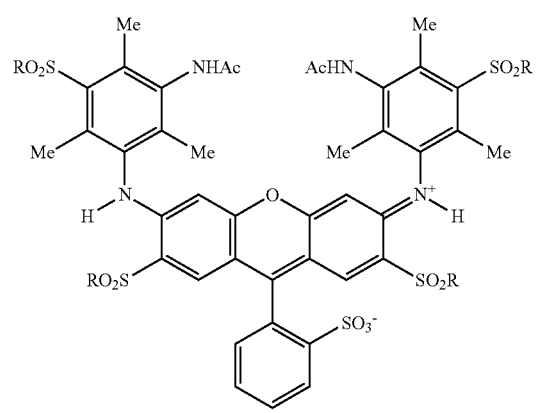
R = ONa or NH₂, ONa/NH₂ = 2/2
(1F)
R = ONa or NH₂, ONa/NH₂ = 2/2
(2A)
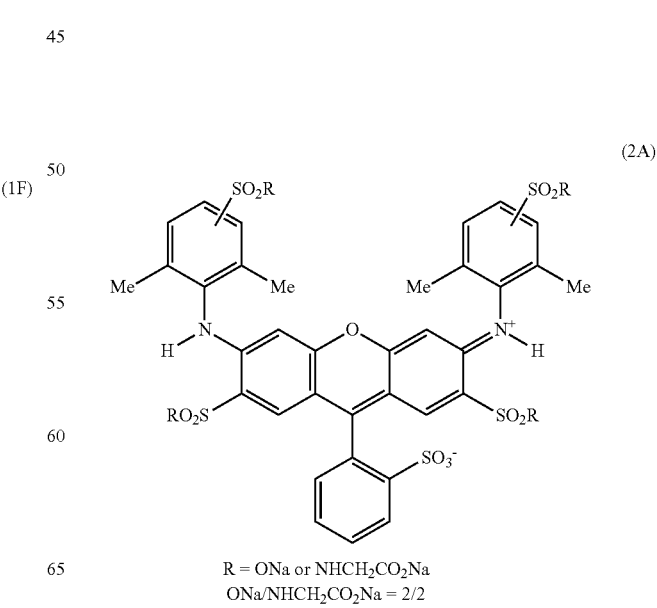
R = ONa or NHCH₂CO₂Na
ONa/NHCH₂CO₂Na = 2/2

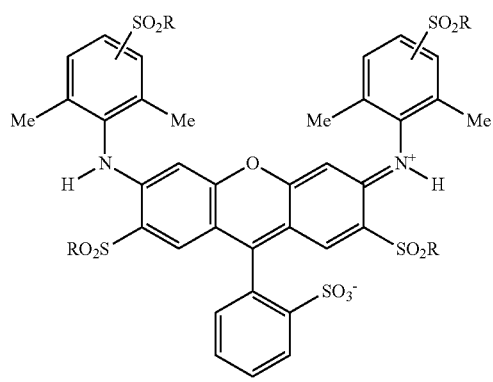
(2B)
R = ONa or NHCH₂CH₂CO₂Na
ONa/NHCH₂CH₂CO₂Na = 2/2
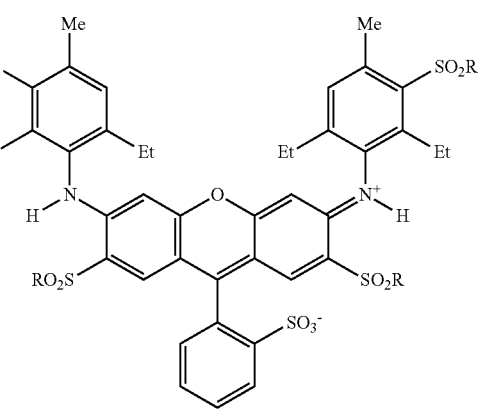
(2E)
R = ONa or NHCH₂CH₂CO₂Na
ONa/NHCH₂CH₂CO₂Na = 3/1
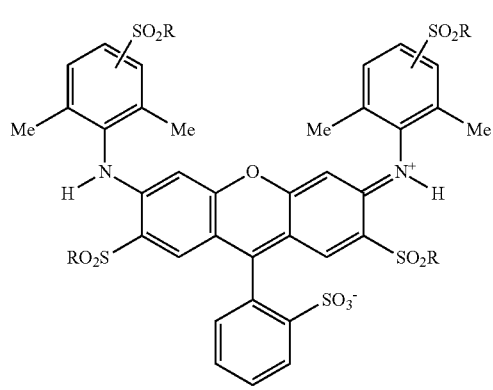
(2C)
R = ONa or N(CH₃)CH₂CO₂Na
ONa/N(CH₃)CH₂CO₂Na = 2/2
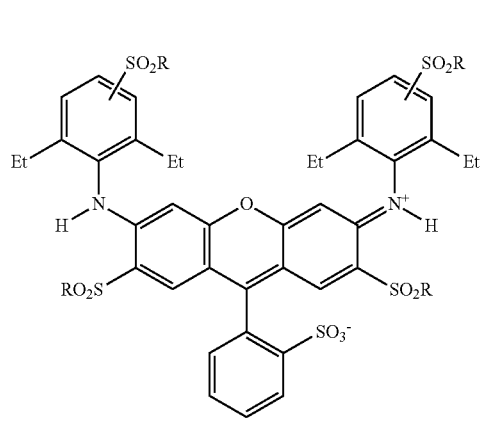
(2F)
R = ONa or NHCH₂CH₂CO₂Na
ONa/NHCH₂CH₂CO₂Na = 1/3
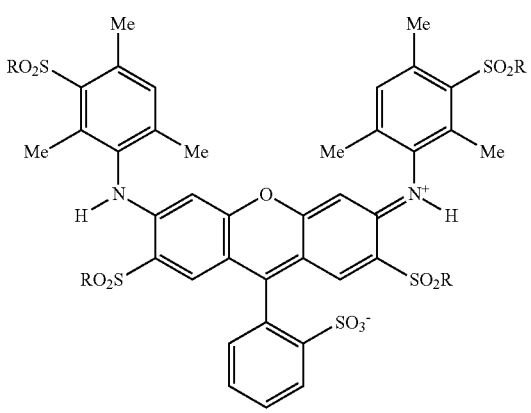
(2D)
R = ONa or NHCH₂CO₂Na
ONa/NHCH₂CO₂Na = 1/3
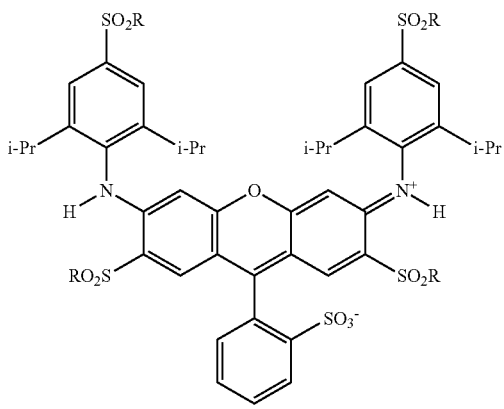
(2G)
R = ONa or NHCH₂CH₂CO₂Na
ONa/NHCH₂CH₂CO₂Na = 1/3

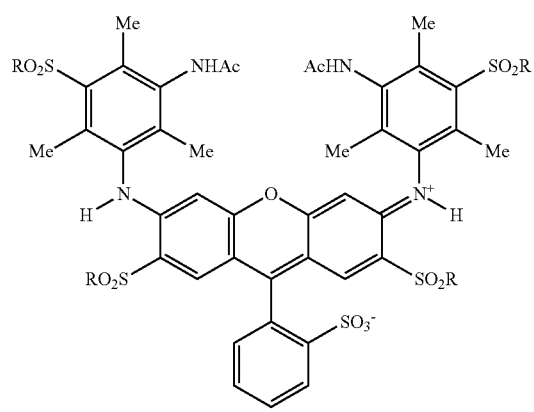

(2H)

R = ONa or NHCH₂CH₂CO₂Na
ONa/NHCH₂CH₂CO₂Na = 1.5/2.5

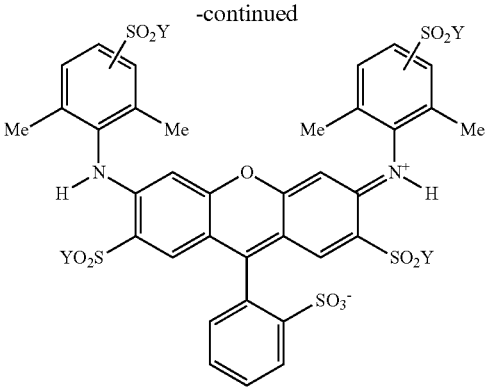

Y = Cl or NR¹R²

↓ NaOH

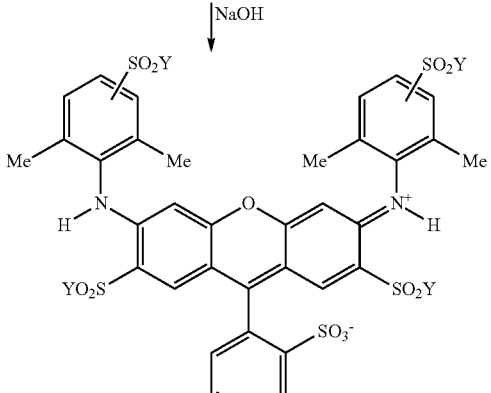

Y = ONa or NR¹R²

The synthesis of the compound represented by Formula (1) of the present invention will be described.

The compound can be synthesized by synthesizing a xanthene dye in accordance to the synthesis of a xanthene dye known in the related art or using a commercially available xanthene dye, chlorosulfonating by combination of chlorosulfonic acid/phosphorous oxychloride, reacting n equivalents of ammonia or amino acid (NHR-L-CO₂M) with the dye, and then, alkaline hydrolyzing unreacted sulfonyl chloride (see the scheme below). The detailed descrption will be made in Examples as described below.

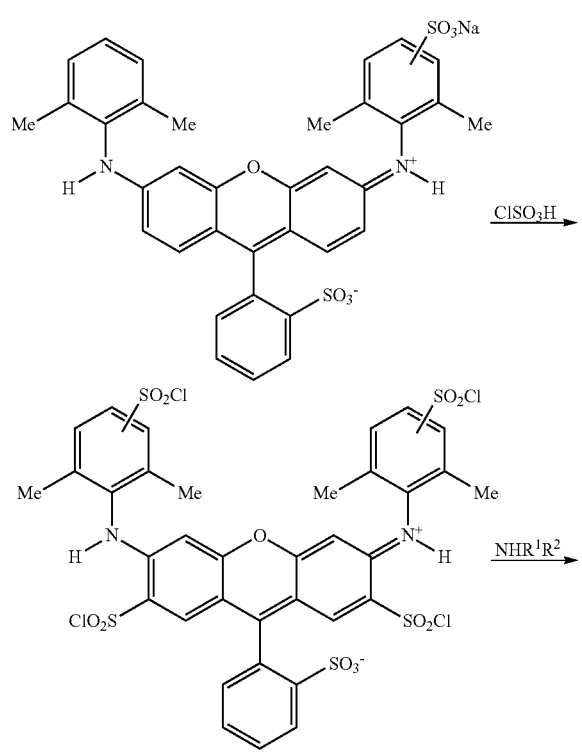

The coloring composition of the present invention contains at least one kind of the compound represented by Formula (1). Although the compound represented by Formula (1) contains a compound of $R^1=R^2=H$ and a compound of $R^1=R$ and $R^2=-L-CO_2M$, both may be contained either alone or in a mixture. Further, from the viewpoint of ease of design for ink prescription, it is preferred that the compound is contained alone.

The coloring composition of the present invention may include a medium. Especially, the coloring composition is suitable for ink for inkjet recording if a solvent is used as the medium. The coloring composition of the present invention may be prepared by dissolving and/or dispersing the compound of the present invention using an oleophilic medium or an aqueous medium as the medium. Preferably, the aqueous medium may be used. The coloring composition of the present invention also includes a composition for ink except the medium.

In the present invention, the content of the compound represented by Formula (1) contained in the coloring composition is determined depending on, for example, the kind of a substituent in Formula (1) to be used or the kind of a solvent component used for preparing the coloring composition. However, the content of the compound represented by Formula (1) in the coloring composition is preferably 1% by mass to 20% by mass, more preferably 1% by mass to 10% by mass, and particularly preferably 2% by mass to 6% by mass based on the total mass of the coloring composition.

If the content of the compound represented by Formula (1) contained in the coloring composition is 1% by mass or more, the color strength of the ink printed on a recording medium may be good and also a required image density may be secured. Also, if the total amount of the compound represented by Formula (1) contained in the coloring composition is 20% by mass or less, there can be achieved effects in that a discharging property of the coloring composition is good, and further, an inkjet nozzle is suppressed from being clogged when used in an inkjet recording method.

The coloring composition of the present invention may contain other additives in a range not impairing the effects of the present invention, if necessary. Other additives may include additives that may be used in ink for inkjet recording as described below.

[Ink for Inkjet Recording]

Hereinafter, ink for inkjet recording of the present invention will be described.

The present invention also relates to an ink for inkjet recording which containes the coloring composition of the present invention.

The ink for inkjet recording may be prepared by dissolving and/or dispersing the compound (mixture) of the present invention in an oleophilic medium or an aqueous medium. Preferably, the ink is prepared by the aqueous medium.

If necessary, other additives may be contained in a range not impairing the effects of the present invention. For example, other additives may be known additives such as, for example, a drying preventing agent (wetting agent), a discoloration preventing agent, an emulsion stabilizer, a permeation promoting agent, a UV absorbent, a preservative, an antifungal agent, a pH adjusting agent, a surface tension regulator, an antifoaming agent, a viscosity regulator, a dispersant, a dispersion stabilizer, a rust inhibitor and a chelating agent. These various kinds of additives are directly added to an ink solution in the case of a water-soluble ink. In the case where an oil-soluble dye is used in a form of a dispersant, the additives are generally added to the dispersant after preparation of the dye dispersant, but may be added in an oil phase or an aqueous phase during the preparation.

The drying preventing agent is appropriately used for the purpose of suppressing an ink discharging hole of a nozzle used in an inkjet recording method from being clogged due to the dryness of the ink for inkjet recording.

The drying preventing agent is preferably a water-soluble organic solvent having vapor pressure lower than that of water. Specific examples thereof may include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerine and trimethylolpropan, lower alkyl ethers of polyhydric alcohol such as ethylene glycol monomethyl (or ethyl)ether, diethylene glycol monomethyl (or ethyl)ether and triethylene glycol monoethyl (or butyl)ether, heterocyclic rings such as 2-pyrrolidone, N-methyl-2-pyrrolidone, 1,3-dimethyl-2-imidazolidinone and N-ethylmorpholine, a sulfur-containing compound such as sulfolan, dimethylsulfoxide and 3-sulfolene, a polyfunctional compound such as diacetone alcohol or diethanol amine, and a urea derivative. Among them, polyhydric alcohol such as glycerine or diethylene glycol is more preferred. Further, the drying preventing agent may be used either alone or in combination of two kinds or more thereof. It is preferred that the drying preventing agent is contained in the ink in an amount of 10% by mass to 50% by mass.

The permeation promoting agent is appropriately used for the purpose of allowing the ink for inkjet recording to be permeated through paper well. As the permeation promoting agent, alcohols such as ethanol, isopropanol, butanol, di(tri) ethylene glycol monobutylether and 1,2-hexanediol, sodium lauryl sulfate, sodium oleate and a non-ionic surfactant, or the like may be used. If the aforementioned permeation promoting agent is included in the ink in an amount of 5% by mass to 30% by mass in the ink, there is generally a sufficient effect, and it is preferred to use the permeation promoting agent in the range of the addition amount not causing spreading of print and print-through.

The UV absorbent is used for the purpose of improving a preservation property of an image. As the UV absorbent, a compound absorbing UV to emit fluorescence, that is, a so-called fluorescent brightening agent, which is represented by a benzotriazole-based compound described in Japanese Patent Application Laid-Open Nos. S58-185677, S61-190537, H2-782, H5-197075 and H9-34057, a benzophenone-based compound described in Japanese Patent Application Laid-Open Nos. S46-2784, H5-194483 and U.S. Pat. No. 3,214,463, a cinnamic acid-based compound described in Japanese Patent Publication Nos. S48-30492, S56-21141 and H10-88106, a triazine-based compound described in Japanese Patent Application Laid-Open Nos. H4-298503, H8-53427, H8-239368, H10-182621 and H8-501291, a compound described in Research Disclosure No. 24239, or a stilbene-based or benzooxazole-based compounds may be used.

The discoloration prevention agent is used for the purpose of improving a preservation property of an image. As the discoloration prevention agent, various kinds of organic and metal complex-based discoloration prevention agents may be used. The organic discoloration prevention agent is hydroquinones, alkoxyphenols, dialkoxyphenols, phenols, anilines, amines, indanes, cromanes, alkoxyanilines, heterocyclics or the like, and the metal complex is a nickel complex, a zinc complex or the like. More specifically, the compound described in the patent documents cited in Paragraphs I to J of VII of Research Disclosure No. 17643, Research Disclosure Nos. 15162, the left column on page 650 of Research Disclosure No. 18716, page 527 of Research Disclosure No. 36544, page 872 of Research Disclosure No. 307105 and Research Disclosure No. 15162, or a compound included in the formula of a representative compound and examples of the compounds described on pages 127 to 137 of Japanese Patent Application Laid-Open No. S62-215272 may be used.

The antifungal agent may be sodium dehydroacetic acid, sodium benzoate, sodium pyridinethione-1-oxide, ethylester p-hydroxybenzoate, 1,2-benzisothiazolin-3-one or a salt thereof. These may be preferably used in the ink in an amount of 0.02% by mass to 1.00% by mass.

As the pH adjusting agent, a neutralizing agent (organic base or inorganic alkali) may be used. The pH adjusting agent is added for the purpose of improving the storage stability of the ink for inkjet recording, so that the pH of the ink for inkjet recording is preferably 6 to 10, and more preferably 7 to 10.

The surface tension regulator may be a non-ionic, cationic or anionic surfactant. Also, the surface tension of the ink for inkjet recording of the present invention preferably ranges from 25 mN/m to 70 mN/m, and more preferably ranges from 25 mN/m to 60 mN/m. Also, the viscosity of ink for inkjet recording of the present invention is preferably 30 mPa·s or less, and is more preferably adjusted to 20 mPa·s or less. Examples of the surfactant preferably include an anionic surfactant such as a fatty acid salt, an alkyl ester sulfate salt, an alkylbenzene sulfonate salt, an alkylnaphthalene sulfonate salt, a dialkyl sulfosuccinate salt, an alkyl ester phosphate salt, a naphthalene sulfonic acid formaline condensate and a polyoxyethylenealkyl ester sulfate salt, or a non-ionic surfactant such as polyoxyethylenealkylether, polyoxyethylenealkylallylether, polyoxyethylene fatty acid ester, sorbitan fatty acid ester, polyoxyethylene sorbitan fatty acid ester, polyoxyethylenealkylamine, glycerine fatty acid ester and an oxyethyleneoxypropylene block copolymer. Further, SURFYNOLS (AirProducts & Chemicals, Co., Ltd.) that is an acetylene-based polyoxyethylene oxide surfactant is preferably used. Further, an amine oxide type ampholytic surfactant such as N,N-dimethyl-N-alkylamine oxide is preferred. Moreover, a matter exemplified as a surfactant on pp. 37 to 38 of Japanese Patent Application Laid-Open No. S59-157,636 and Research Disclosure No. 308119 (1989) may be used.

As the antifoaming agent, a fluorine-based or silicon-based compound, a chelating agent represented by EDTA, or the like may be used if necessary.

In the case where the compound of the present invention is dispersed in an aqueous medium, it is preferred that coloring fine particles containing the compound and an oil-soluble polymer are dispersed in the aqueous medium as described in Japanese Patent Application Laid-Open No. H11-286637, Japanese Patent Application Nos. 2000-78491, 2000-80259 and 2000-62370, or the compound of the present invention dissolved in a high boiling point organic solvent is dispersed in the aqueous medium as described in Japanese Patent Application Nos. H2000-78454, 2000-78491, 2000-203856 and 2000-203857. In the case where the compound of the present invention is dispersed in the aqueous medium, a specific method, an oil-soluble polymer, a high boiling point organic solvent, additives, and the amounts thereof to be used may preferably refer to the description in the aforementioned patent documents. Otherwise, the compound of the present invention may be dispersed in a solid fine particle state. In the dispersion, a dispersant or a surfactant may be used. As a dispersion device, a simple stirrer or impeller agitation type, an inline agitation type, a mill type (for example, a colloid mill, a ball mill, a sand mill, an attritor, a roll mill or an agitator mill), an ultrasonic type, and a high pressure emulsification and dispersion type (high pressure homogenizer; Goehring homogenizer, microfluidizer, DeBEE2000 or the like as a specific commercially-available device) may be used. The aforementioned method of preparing the ink for inkjet recording is described in detail in Japanese Patent Application Laid-Open Nos. H5-148436, H5-295312, H7-97541, H7-82515, H7-118584 and H11-286637, and Japanese Patent Application No. 2000-87539, in addition to the aforementioned patent documents, and may be used for the ink for inkjet recording of the present invention.

As the aqueous medium, a mixture that contains water as a main component, and if necessary, is added with a water-miscible organic solvent may be used. Examples of the water-miscible organic solvent may include alcohol (for example, methanol, ethanol, propanol, isopropanol, butanol, isobutanol, sec-butanol, t-butanol, pentanol, hexanol, cyclohexanol and benzylalcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerine, hexanetriol and thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monoethyl ether acetate, triethylene glycol monomethyl ether, triethylene glycol monoethyl ether and ethylene glycol monophenyl ether), amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). Meanwhile, the water-miscible organic solvents may be used in combination of two or more thereof.

In 100 parts by mass of the ink for inkjet recording of the present invention, the compound represented by Formula (1) or Formula (4) is contained preferably in an amount of 0.2 parts by mass to 10 parts by mass, and more preferably in an amount of 1 part by mass to 6 parts by mass. Also, in the ink for inkjet recording of the present invention, the compound of the present invention may be used in combination with other colorants. When two or more kinds of colorants are used in combination, the total content of the colorants is preferably within the aforementioned range.

The ink for inkjet recording of the present invention preferably has a viscosity of 30 mPa·s or less. Also, the surface tension is preferably 25 mN/m to 70 mN/m. The viscosity and the surface tension may be adjusted by addition of various kinds of additives, such as, for example, a viscosity regulator, a surface tension regulator, a specific fastness adjusting agent, a film regulator, a UV absorbent, an antioxidant, a discoloration prevention agent, an antifungal agent, a rust inhibitor, a dispersant and a surfactant.

The ink for inkjet recording of the present invention may be used to form a monochromic image or form an image of a full color. In order to form the full color image, a magenta color-tone ink, a cyan color-tone ink and a yellow color-tone ink may be used, and also a black color-tone ink may be further used so as to set up color-tones.

As an applicable yellow dye, arbitrary matters may be used. Examples thereof may include an aryl or heterylazo dye having heterocyclic rings such as phenols, naphthols, anilines, pyrazolone or pyridones, chain-opening active methylene compounds, or the like as a coupling component (hereinafter, referred to as "coupler component"); an azomethine dye having chain-opening active methylene compounds or the like as a coupler component; a methine dye such as, for example, a benzylidene dye and a monomethineoxonol dye; and a quinine-based dye such as, for example, a naphthoquinone dye and an anthraquinone dye. Examples of other kinds of the dye may include a quinophthalon dye, a nitro and nitroso dye, an acridine dye, an acrydinone dye and the like.

As an applicable magenta dye, arbitrary matters may be used. Examples thereof may include an aryl or heterylazo dye having phenols, naphthols, anilines or the like as a coupler component; an azomethine dye having pyrazolones, pyrazolotriazoles or the like as a coupler component; a methine dye such as an arylidene dye, a styryl dye, a melocyanine dye, a cyanine dye and an oxonol dye; a carbonium dye such as a diphenylmethane dye, a triphenylmethane dye and a xanthene dye, a quinone-based dye such as naphthoquinone, anthraquinone and anthrapyridone, and a condensed polycyclic ring-based dye such as a dioxadin dye.

As an applicable cyan dye, arbitrary matters may be used. Examples thereof may include an aryl or heterylazo dye having phenols, naphthols, anilines or the like as a coupler component; an azomethine dye having heterocyclic rings such as phenols, naphthols, and pyrrolotriazoles, or the like as a coupler component; a polymethine dye such as a cyanine dye, an oxonol dye and a melocyanine dye; a carbonium dye such as a diphenylmethane dye, a triphenylmethane dye and a xanthene dye; a phthalocyanine dye; an anthraquinone dye; indigo and thioindigo dyes and the like.

Each of the aforementioned dyes may be a matter in which a portion of chromophore is dissociated to initially have each color of yellow, magenta and cyan, and in this case, the countercation may be an inorganic cation such as alkali metal or ammonium, an organic cation such as pyridinium or a quaternary ammonium salt, or a polymer cation having the aforementioned cations as a partial structure.

Examples of an applicable black coloring material may include a dispersing element of carbon black besides disazo, trisazo and tetrazo dyes.

The ink composition of the present invention may be used in a recording method such as, for example, sealing, copying, marking, writing, drawing and stamping, and is particularly suitably used in an inkjet recording method.

[Inkjet Recording Method]

The present invention also relates to an inkjet recording method of forming an image by using the coloring composition or the ink for inkjet recording of the present invention.

The inkjet recording method of the present invention donates energy to the ink for inkjet recording, and forms an image on known image-receiving materials, that is, plain paper, resin-coated paper, exclusive inkjet paper described in, for example, Japanese Patent Application Laid-Open Nos. H8-169172, H8-27693, H2-276670, H7-276789, H9-323475, S62-238783, Japanese H10-153989, H10-217473, H10-235995, H10-337947, H10-217597 and H10-337947, film, paper for use in electrophotography, fabric, glass, metal, ceramic, or the like.

When an image is formed, a polymer fine particle dispersion (also known as polymer latex) may be used in combination in order to impart a glossiness or a water fastness, or improve a weather fastness. The polymer latex may be added to the image-receiving material before, after or simultaneously with application of a colorant, and accordingly, may be added into image-receiving paper, or ink, or used alone as a liquid. Specifically, the methods described in Japanese Patent Application Nos. 2000-363090, 2000-315231, 2000-354380, 2000-343944, 2000-268952, 2000-299465, 2000-297365, and the like may be preferably used.

Hereinafter, the recording paper and the recording film used to perform inkjet printing by using ink of the present invention will be described.

In the recording paper and the recording film, a support is formed of a chemical pulp such as LBKP and NBKP, a mechanical pulp such as GP, PGW, RMP, TMP, CTMP, CMP and CGP, a used-paper pulp such as DIP, or the like, and, if necessary, a matter manufactured by various kinds of devices such as a fourdrinier paper machine or a rotoformer paper machine by mixing additives known in the art, such as a pigment, a binder, a sizing agent, a settlement agent, a cationic agent, a strength additive for paper, or the like may be used. In addition to the aforementioned support, any matter of a synthetic paper and a plastic film sheet may be used, and it is preferred that the thickness of the support is 10 μm to 250 μm, and the basis weight thereof is 10 g/m$^2$ to 250 g/m$^2$.

The support may be provided with an ink-receiving layer and a backcoat layer at once, or may be provided with an ink-receiving layer and a backcoat layer after a size press or an anchor coat layer is formed by starch, polyvinyl alcohol or the like. Further, the support may be subjected to planarization treatment by a calender device such as a machine calender, a TG calender, or a soft calender. In the present invention, paper and plastic films in which polyolefins (for example, polyethylene, polystyrene, polyethylene terephthalate, polybutene, and a copolymer thereof) are laminated on both surfaces thereof are more preferably used as the support. It is preferred that a white pigment (e.g., titanium oxide or zinc oxide) or a coloring dye (e.g., cobalt blue, navy blue or neodymium oxide) is added to polyolefins.

The ink-receiving layer formed on the support contains a pigment or an aqueous binder. As the pigment, a white pigment is preferred, and examples of the white pigment may include an inorganic white pigment such as calcium carbonate, kaolin, talc, clay, diatomite, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as a styrene-based pigment, an acrylic pigment, a urea resin and a melamine resin. As the white pigment contained in the ink-receiving layer, a porous inorganic pigment is preferred, and in particular, for example, synthetic amorphous silica having a large fine pore area is appropriate. As the synthetic amorphous silica, any of silicic acid anhydride obtained by a dry manufacturing method and water-containing silicic acid obtained by a wet manufacturing method may be used. In particular, water-containing silicic acid is preferably used.

Examples of the aqueous binder contained in the ink-receiving layer may include water-soluble polymer such as polyvinyl alcohol, silanol denatured polyvinyl alcohol, starch, cationic starch, casein, gelatin, carboxymethyl cellulose, hydroxyethyl cellulose, polyvinylpyrrolidone, polyalkylene oxide and a polyalkylene oxide derivative, and a water dispersible polymer such as a styrenebutadiene latex and an acryl emulsion. The aqueous binder may be used either alone or in combination of two kinds or more thereof. In the present invention, among them, polyvinyl alcohol or silanol denatured polyvinyl alcohol is particularly suitable from the viewpoints of the attachment property to the pigment and the stripping fastness of an ink-receiving layer.

The ink-receiving layer may contain a mordant, an insolubilizer, a light fastness improving agent, a surfactant or other additives in addition to the pigment and the aqueous binder.

It is preferred that a mordant added to the ink-receiving layer is immobilized. To this end, a polymer-mordant is preferably used.

The polymer-mordant is described in Japanese Patent Application Laid-Open Nos. S48-28325, S54-74430, S54-124726, S55-22766, S55-142339, S60-23850, S60-23851, S60-23852, S60-23853, S60-57836, S60-60643, S60-118834, S60-122940, S60-122941, S60-122942, S60-235134 and H1-161236, and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material including the polymer-mordant described on pages 212 to 215 of Japanese Patent Application Laid-Open No. H1-161236 is particularly preferred. If the polymer-mordant described in the aforementioned patent document is used, an image having an excellent image quality may be obtained, and the light fastness of the image is improved.

The insolubilizer is effective to insolubilization of the image, and it is particularly preferred that a cation resin is an insolubilizer. The cation resin may be polyamidepolyamineepichlorohydrin, polyethyleneimine, polyaminesulfone, dimethyldiallylammonium chloride polymer, cation polyacrylamide, colloidal silica or the like. Among the cation resins, polyamidepolyamineepichlorohydrin is particularly appropriate. The content of the cation resin is preferably 1% by mass to 15% by mass and particularly preferably 3% by mass to 10% by mass based on the total solid of the ink-receiving layer.

Examples of the light fastness improving agent may include zinc sulfide, zinc oxide, hindered amine-based antioxidant, a benzotriazole-based UV absorbent such as benzophenone, and the like. Among them, zinc sulfide is particularly appropriate.

The surfactant serves as a coating aid, a stripping improving agent, a slipping preventing agent or an antistatic agent. The surfactant is described in Japanese Patent Application Laid-Open Nos. S62-173463 and S62-183457. An organic fluoro compound may be used instead of the surfactant. It is preferred that the organic fluoro compound is hydrophobic. Examples of the organic fluoro compound include a fluorine-based surfactant, an oil phase fluorine-based compound (for example, fluorine oil), and a solid type fluorine compound resin (for example, a tetrafluoroethylene resin). The organic fluoro compound is described in Japanese Patent Publication No. S57-9053 (8th to 17th columns), and Japanese Patent Application Laid-Open Nos. S61-20994 and S62-135826. Other additives to be added to the ink-receiving layer may include a pigment dispersant, a thickener, an antifoaming agent, a dye, a fluorescent brightening agent, a preservative, a pH adjusting agent, a matting agent, a hardening agent or the like. Also, the ink-receiving layer may have one layer or two layers.

The backcoat layer may be provided into the recording paper and the recording film, and the component that may be added to the layer may be a white pigment, a water-based binder or other components. Examples of the white pigment contained in the backcoat layer may include a white inorganic pigment such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo boehmite, aluminum hydroxide, alumina, lithopone, zeolite, hydrate halloysite, magnesium carbonate and magnesium hydroxide, an organic pigment such as a styrene-based plastic pigment, an acrylic plastic pigment, polyethylene, microcapsules, a urea resin and a melamine resin, and the like.

Examples of the water-based binder contained in the backcoat layer may include a water-soluble polymer such as a styrene/maleate copolymer, a styrene/acrylate copolymer, polyvinyl alcohol, silanol-modified polyvinyl alcohol, starch, cationic starch, casein, gelatin, carboxymethyl cellulose, hydroxyethyl cellulose and polyvinylpyrrolidone, a water-dispersible polymer such as a styrenebutadiene latex and an acryl emulsion, and the like. Examples of the other component contained in the backcoat layer may include an antifoaming agent, a defoaming agent an antifoaming agent, a dye, a fluorescent brightening agent, a preservative, an insolubilizer and the like.

Polymer latex may be added to a constitutional layer (including the backcoat layer) of the inkjet recording paper and the recording film. Polymerlatex is used for the purpose of improvement in physical properties of the layer, such as dimensional stabilization, curling prevention, attachment prevention, and crack prevention of the layer. Polymerlatex is described in Japanese Patent Application Laid-Open Nos. S62-245258, S62-136648 and S62-110066. When polymerlatex having a low glass transition temperature (40° C. or less) is added to the layer including the mordant, cracks or curling of the layer may be prevented. Further, even though polymerlatex having a high glass transition temperature is added to the backcoat layer, curling may be prevented.

The inkjet recording method using the ink of the present invention is not limited, and is used in a known manner, for example, a charge control manner discharging an ink using electrostatic force, a drop-on-demand manner (pressure pulse manner) using vibration pressure of a piezo element, a sound inkjet manner discharging an ink using radiation pressure by changing an electric signal into a sound beam and radiating the beam to the ink, a thermal inkjet manner using pressure generated by heating an ink to form bubbles, and the like.

In the inkjet recording method, a manner of injecting ink that is called photo ink at a low concentration in a plurality of small volumes, a manner of improving an image by using a plurality of inks having substantially the same color and different concentrations, and a manner of using colorless transport ink are included.

[Compound Represented by Formula (1)]

The present invention also relates to the compound represented by the following Formula (11.

Formula (1)

In Formula (1), D represents a residue structure in which four hydrogen atoms are removed from the compound represented by the following Formula (2).

$R^1$ and $R^2$ are $R^1=R^2=H$, or $R^1=R$ and $R^2=-L-CO_2M$.

R represents a hydrogen atom or a monovalent substituent. When a plurality of R is present, R's may be the same or different.

L represents a divalent linking group. When a plurality of L is present, L's may be the same or different.

M represents a hydrogen atom or a countercation. When a plurality of M is present, M's may be the same or different.

n represents the number of 1 to 4, m represents a number of 0 to 3, provided that m+n is 4.

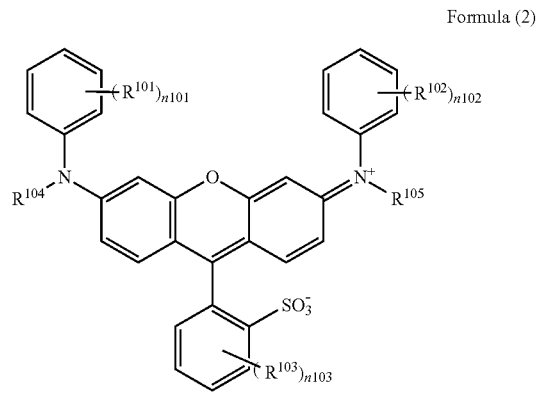

Formula (2)

In Formula (2), $R^{101}$, $R^{102}$ and $R^{103}$ each independently represent a monovalent substituent, $R^{104}$ and $R^{105}$ each independently represent a hydrogen atom or a monovalent substituent, n101 and n102 each independently represent the number of 0 to 5, n103 represents the number of 0 to 4. When n101, n102 and n103 each represent the number of 2 or more, each of pluralities of $R^{101}$, $R^{102}$ and $R^{103}$ may be the same or different.

Preferred ranges of the compound represented by Formula (1) of the present invention and each substituent in Formula (1) are the same as the preferred ranges defined with respect to the compound represented by Formula (1) contained in the coloring composition of the present invention.

EXAMPLES

Hereinafter, the present invention will be described in detail by examples, but the present invention is not limited to those examples. In the examples, "%" and "part" represent "% by mass" and "parts by mass", respectively otherwise specified.

Synthesis Example

Synthesis of Exemplary Compound (1B)

120 g of chlorosulfonic acid and 12.4 g of phosphorous oxychloride were added to a 500 mL three-necked flask, followed by stirring at room temperature. 19.1 g of Acid Red 289 (manufactured by Chugai Kasei Co., Ltd., Purity: 71%) was added slowly in portions thereto, and then, reacted at an internal temperature of 70° C. for 1 hour. The reactant was left standing to cool to room temperature and poured carefully to 600 g of ice. Then, the precipitated crystal was separated by filtration and washed with cold saturated brine (Paste A, about 81 g).

300 mL of water was added to a 1000 mL beaker, and its pH was adjusted to 8.5 with 2N sodium hydroxide. 2.64 g of ammonium chloride was added thereto, dissolved, and then, cooled to 5° C. or lower. The previously prepared paste A was added in portions at an internal temperature of 5° C. or lower. 50 mL of water was added, and the internal temperature was increased up to 55° C. while maintaining the pH to 8.5 with an aqueous sodium hydroxide solution, followed by allowing to be reacted until change in pH was disappeared. The reaction solution was subjected to dust removal filtration with a GF/F fliter manufactured by Whatman, Inc. About 25% by mass of sodium chloride was added to the obtained filtrate, the pH was adjusted to 2.0 with concentrated hydrochloric acid, and the precipitated crystal was separated by filtration. The obtained crystal was dissolved in 600 mL of water while adjusting the pH to 9 with 2N sodium hydroxide, subjected to desalination by using a dialysis tube until the conductivity became 10 μS or less, and subjected to dust removal filtration again with a GF/F filter manufactured by Whatman, Inc. The obtained filtrate was concentrated to dryness to obtain 10.0 g of a gloss crystal of Exemplary Compound (1B).

From MS spectrum, 894 corresponding to (M-H)$^-$ of m=2, n=2, 893 corresponding to (M-H)$^-$ of m=1, n=3 were observed. Further, the ratio of Exemplary Compound (1B) was confirmed from the content of dye by using a measured value of water by Karl-Fischer method and the content of a sodium ion by ion chromatography.

Other exemplary compounds can be also synthesized in accordance to the above-described method.

Example 1

Deionized water was added to the following contents to be amount of 100 g, followed by stirring for 1 hour while heating at 30 to 40° C. Thereafter, the solution was prepared with 10 mol/L of KOH so as to have pH=9, and subjected to a filtration under reduced pressure with a microfiltger having an average pore size of 0.25 μm to prepare a magenta ink solution.

Composition of Ink Solution 1:
Dye (the following compound (1A)) 3.50 g
Diethylene glycol 10.65 g
Glycerin 14.70 g
Diethylene glycol monobutyl ether 12.70 g
Triethanolamine 0.65 g
Olfin E1010 (acetylene glycol-based surfactant, manufactured by Nishin Kagaku Co., Ltd.) 0.9 g

Examples 2 to 16 and Comparative Examples 1 to 4

Ink Solutions 2 to 8 and Comparative Ink Solutions 1 to 4 as ink solutions for comparison were prepared in the same as in preparation of Ink Solution 1, except that the dye was changed as shown in Tables 1 and 2 below.

Further, the ink solutions of Comparative Examples 3 and 4 could not be evaluated because the colorants were not dissolved.

(Image Recording and Evaluation)

The following evaluation was performed on each ink for inkjet recording in Examples and Comparative Examples. The results are shown in Tables 1 and 2.

Further, in Table 1 and 2, the hue, ozone fastness, print concentration and moisture fastness were evaluated after using each ink for inkjet recording to record its image on a photo gloss paper (PM Photo paper <Glossy> (KA420PSK, EPSON) manufactured by EPSON Co., Ltd.) by an inkjet printer (PM-700C, manufactured by EPSON Co., Ltd.).

<Hue>

The hue was evaluated by a three-stage rating, that is, best, good and poor by naked eyes. In Tables 1 and 2 below, A denotes that the hue is best, B denotes that the hue is good and C denotes that the hue is poor.

<Ozone Fastness>

In a box set to an ozone gas concentration of 0.5±0.1 ppm, room temperature and dark place using a Siemens-type ozonizer to which an a.c. voltage of 5 kV was applied while passing a dry air through the double glass tube, the photo gloss paper having the image formed thereon was left standing for 7 days. The image density before and after standing in an ozone gas atmosphere was measured by a reflection densitometer (X-Rite 310TR) and evaluated as the dye residual ratio. The reflection density was measured at three points of 1, 1.5 and 2.0. The ozone gas concentration in the box was set using an ozone gas monitor (Model OZG-EM-01) manufactured by APPLICS.

The evaluation was performed by a three-stage rating, that is, A is a dye residual ratio of 70% or more at any density, B is less than 70% at one or two points, and C is less than 70% at all densities.

<Print Concentration>

The concentration was measured by using X-lite (trade name, manufactured by X-lite Corp.) which is a 100% concentration portion of a printed sample, and evaluated by a three-stage rating, that is, A is 2.3 or more, B is 2.2 or more and less than 2.3, and C is 2.2 or less.

<Moisture Fastness>

A printed sample was stored under conditions of 35° C. and 80% RH for a week, and evaluated by a three-stage rating for image spreading, that is, A is no spreading or a case of mostly unnoticeable level, B is a case of slight spreading, and C is a case of clear spreading.

TABLE 1

| | Dye of Formula (1) | Ozone Fastness | Print Concentration | Hue | Moisture Fastness | Remark |
|---|---|---|---|---|---|---|
| Example 1 | 1A | A | A | A | A | Inventive |
| Example 2 | 1B | A | A | A | A | Inventive |
| Example 3 | 1C | A | A | A | A | Inventive |
| Example 4 | 1D | A | A | A | A | Inventive |
| Example 5 | 1E | A | A | A | A | Inventive |
| Example 6 | 1F | A | A | A | A | Inventive |
| Example 7 | 1G | A | A | A | A | Inventive |
| Example 8 | 1H | A | A | A | A | Inventive |
| Comparative Example 1 | Comparative Colorant A | A | A | A | C | Comparative |
| Comparative Example 2 | C. I. Acid Red 289 | C | A | A | C | Comparative |
| Comparative Example 3 | Comparative Colorant B | — | — | — | — | Comparative |

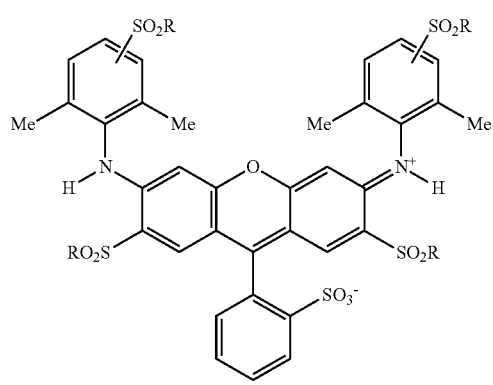

(1A)

R = ONa or NH$_2$, ONa/NH$_2$ = 2/2

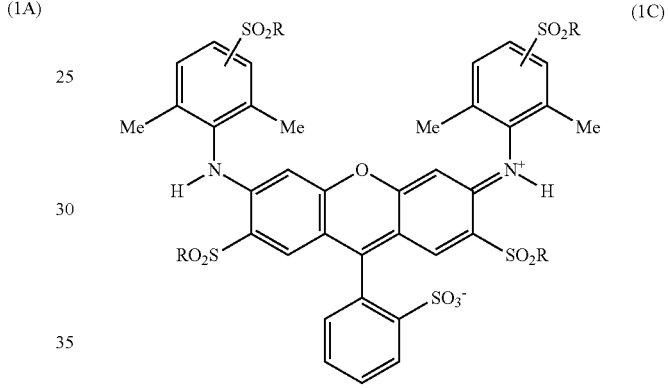

(1C)

R = ONa or NH$_2$, ONa/NH$_2$ = 3/1

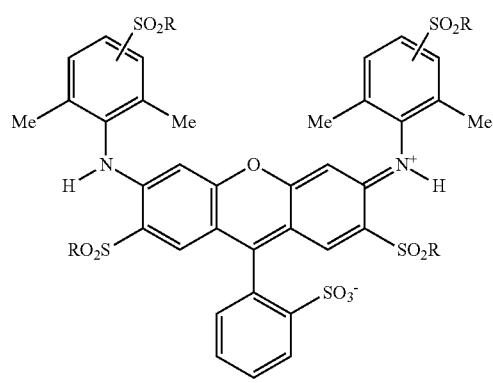

(1B)

R = ONa or NH$_2$, ONa/NH$_2$ = 1.5/2.5

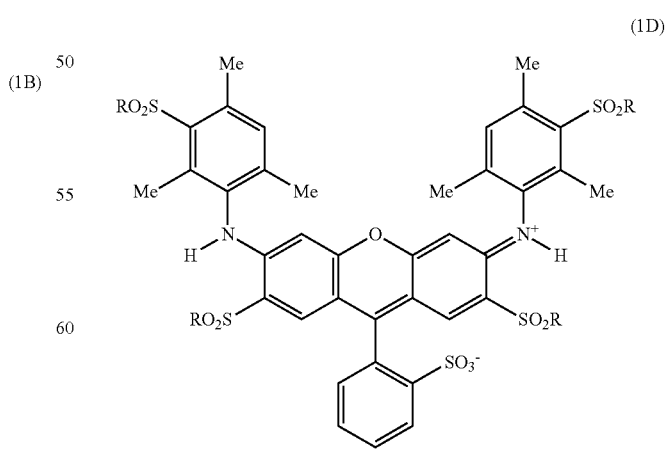

(1D)

R = ONa or NH$_2$, ONa/NH$_2$ = 1/3

(1E)
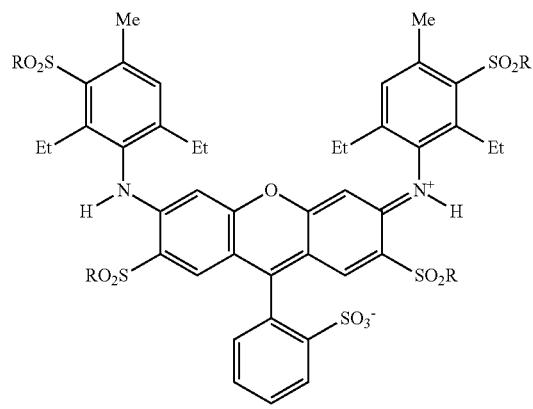
R = ONa or NH₂, ONa/NH₂ = 2/2
(1F)
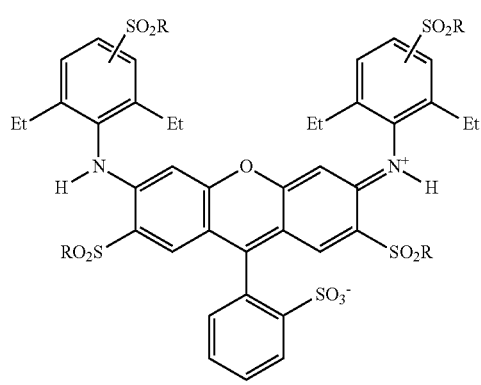
R = ONa or NH₂, ONa/NH₂ = 2/2
(1G)
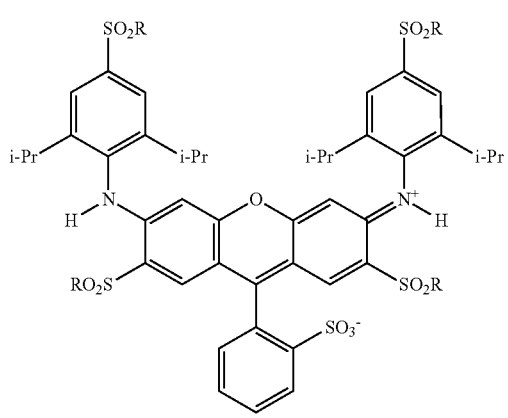
R = ONa or NH₂, ONa/NH₂ = 2/2
(1H)
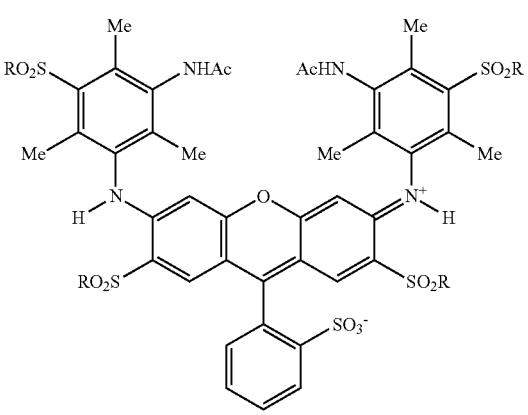
R = ONa or NH₂, ONa/NH₂ = 2/2
(Comparative Colorant A)
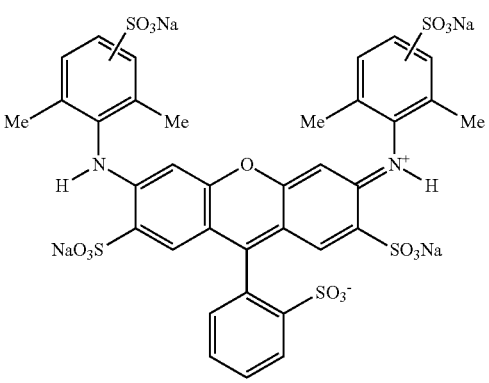
(C. I. Acid Red 289)
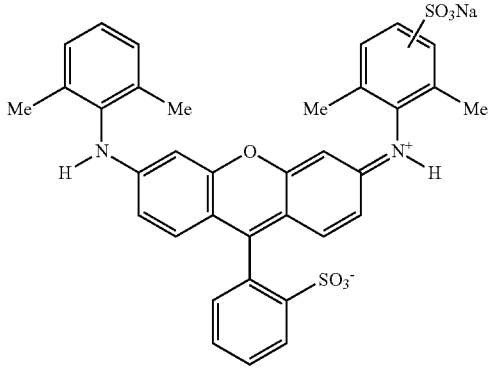

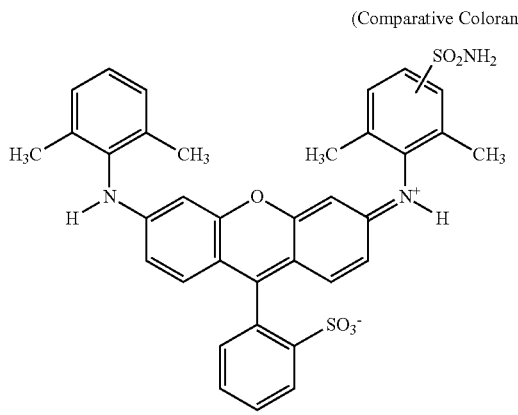

(Comparative Colorant B)

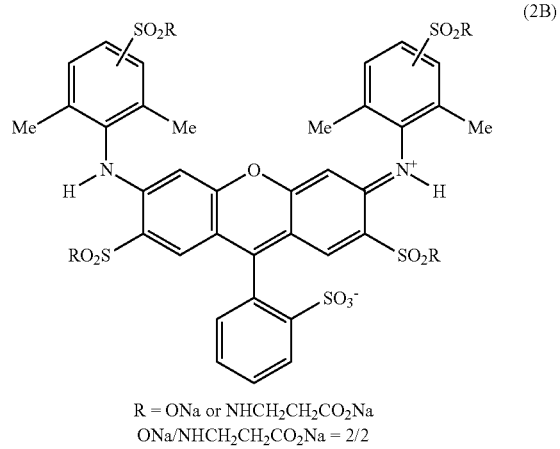

R = ONa or NHCH₂CH₂CO₂Na
ONa/NHCH₂CH₂CO₂Na = 2/2

TABLE 2

| | Dye of Formula (1) | Ozone Fastness | Print Concentration | Hue | Moisture Fastness | Remark |
|---|---|---|---|---|---|---|
| Example 9 | 2A | A | A | A | A | Inventive |
| Example 10 | 2B | A | A | A | A | Inventive |
| Example 11 | 2C | A | A | A | A | Inventive |
| Example 12 | 2D | A | A | A | A | Inventive |
| Example 13 | 2E | A | A | A | A | Inventive |
| Example 14 | 2F | A | A | A | A | Inventive |
| Example 15 | 2G | A | A | A | A | Inventive |
| Example 16 | 2H | A | A | A | A | Inventive |
| Comparative Example 1 | Comparative Colorant A | A | A | A | C | Comparative |
| Comparative Example 2 | C. I. Acid Red 289 | C | A | A | C | Comparative |
| Comparative Example 4 | Comparative Colorant B | — | — | — | — | Comparative |

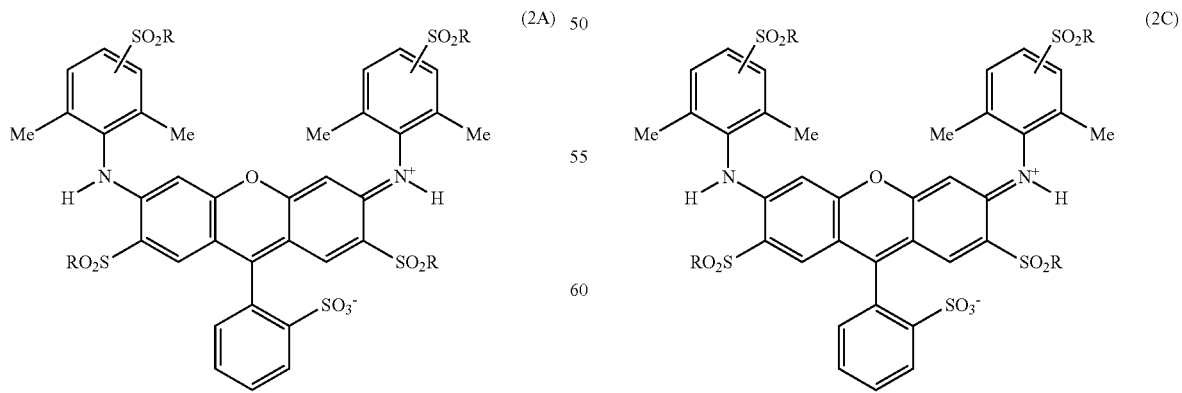

R = ONa or NHCH₂CO₂Na
ONa/NHCH₂CO₂Na = 2/2

R = ONa or N(CH₃)CH₂CO₂Na
ONa/N(CH₃)CH₂CO₂Na = 2/2

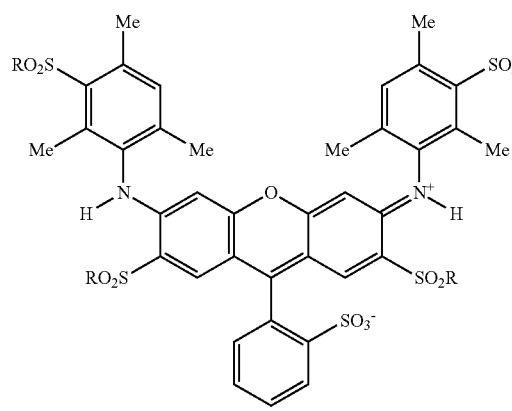

(2D)

R = ONa or NHCH$_2$CO$_2$Na
ONa/NHCH$_2$CO$_2$Na = 1/3

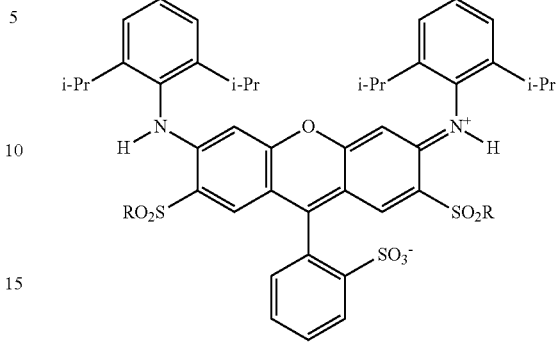

(2G)

R = ONa or NHCH$_2$CO$_2$Na
ONa/NHCH$_2$CO$_2$Na = 1/3

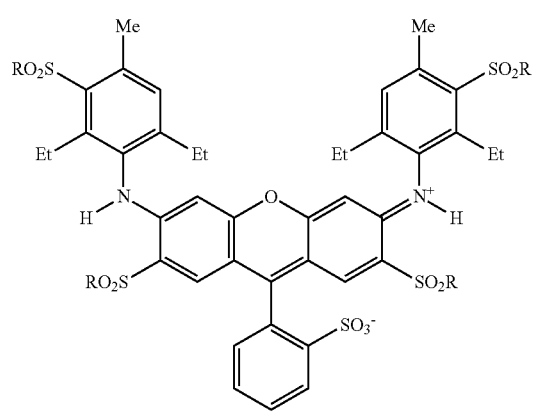

(2E)

R = ONa or NHCH$_2$CO$_2$Na
ONa/NHCH$_2$CO$_2$Na = 3/1

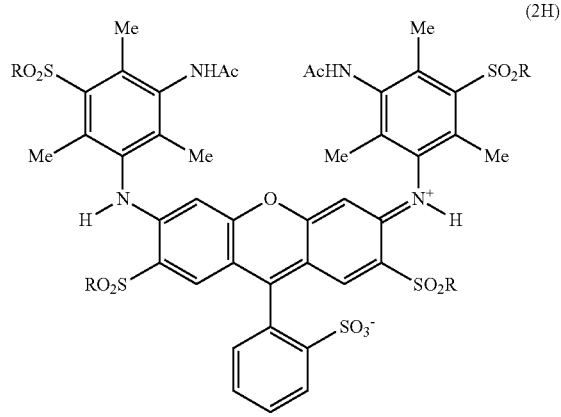

(2H)

R = ONa or NHCH$_2$CO$_2$Na
ONa/NHCH$_2$CO$_2$Na = 1.5/2.5

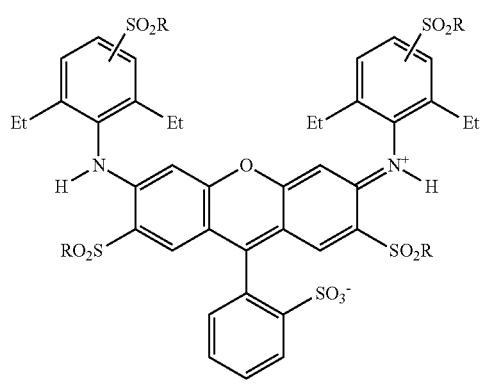

(2F)

R = ONa or NHCH$_2$CO$_2$Na
ONa/NHCH$_2$CO$_2$Na = 1/3

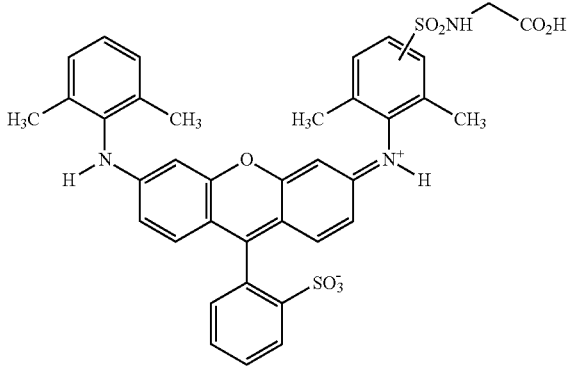

(Comparative Colorant C)

As seen clearly from the results in Tables 1 and 2, it is understood that the ink in Examples using the coloring composition of the present invention is able to form an image which is excellent in moisture fastness as well as hue, print concentration and ozone fastness.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A coloring composition comprising a compound represented by Formula (1):

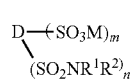

wherein D represents a residue structure in which four hydrogen atoms are removed from the compound represented by Formula (2), $R^1$ and $R^2$ represent $R^1$=$R^2$=H, or $R^1$=R and $R^2$=-L-$CO_2M$, R represents a hydrogen atom or a monovalent substituent, and when a plurality of R is present, R's may be the same or different, L represents a divalent linking group, and when a plurality of L is present, L's may be the same or different, M represents a hydrogen atom or a counteraction, and when a plurality of M is present, M's may be the same or different, and n represents the number of 1 to 4, and m represents the number of 0 to 3, provided that m+n is 4:

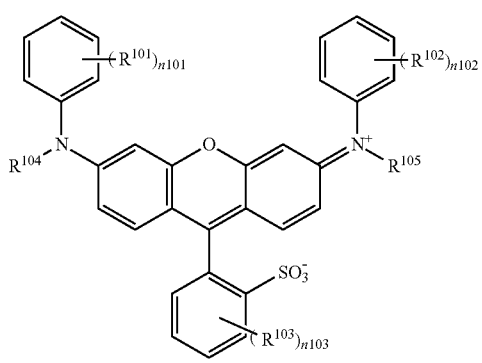

wherein $R^{101}$, $R^{102}$ and $R^{103}$ each independently represent a monovalent substituent, $R^{104}$ and $R^{105}$ each independently represent a hydrogen atom or a monovalent substituent, and $n^{101}$ and $n^{102}$ each independently represent the number of 0 to 5, and $n^{103}$ represents 0 to 4, and when $n^{101}$, $n^{102}$ and $n^{103}$ each represent the number of 2 or more, each of pluralities of $R^{101}$, $R^{102}$ and $R^{103}$ may be the same or different.

2. The coloring composition according to claim 1, wherein the compound represented by Formula (1) is a compound represented by the following Formula (3):

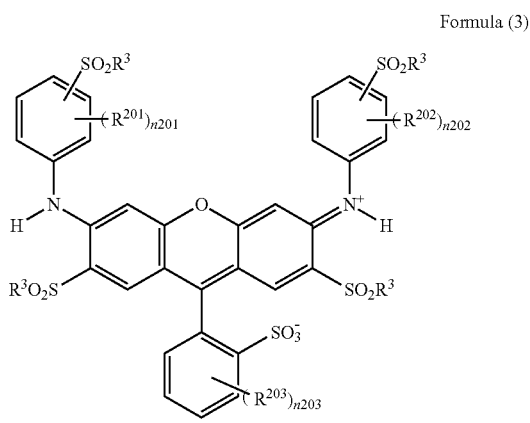

wherein when $R^1$ and $R^2$ are $R^1$=$R^2$=H, $R^3$'s each independently represent OM or $NH_2$, provided that, when $R^1$ and $R^2$ are $R^1$=$R^2$=H, at least one of $R^3$'s represent $NH_2$, when $R^1$ and $R^2$ are $R^1$=R and $R^2$=-L-$CO_2M$, $R^3$'s each independently represent OM or NR-L-$CO_2M$, provided that when $R^1$ and $R^2$ are $R^1$=R and $R^2$=-L-$CO_2M$, at least one of $R^3$'s represent NR-L-$CO_2M$, R represents a hydrogen atom or a monovalent substituent, and when a plurality of R is present, R's may be the same or different, L represents a divalent linking group, and when a plurality of L is present, L's may be the same or different, $R^{201}$, $R^{202}$ and $R^{203}$ each independently represent a monovalent substituent, n201 and n202 each independently represent the number of 0 to 4, n203 represents the number of 0 to 4, and when n201, n202 and n203 each represent the number of 2 or more, each of pluralities of $R^{201}$, $R^{202}$ and $R^{203}$ may be the same or different, and M represents a hydrogen atom or a counteraction, and when a plurality of M is present, M's may be the same or different.

3. The coloring composition according to claim 1, wherein $R^{101}$, $R^{102}$, $R^{103}$, $R^{201}$, $R^{202}$ and $R^{203}$ each independently represent an alkyl group or an acylamino group.

4. The coloring composition according to claim 1, wherein $R^{101}$, $R^{102}$, $R^{103}$, $R^{201}$, $R^{202}$ and $R^{203}$ each independently represent an alkyl group having 1 to 6 carbon atoms.

5. The coloring composition according to claim 1, wherein n101, n102, n201 n202 each independently represent the number of 2 to 4.

6. The coloring composition according to claim 1, wherein n103 and n203 represent 0.

7. The coloring composition according to claim 1, wherein M is a lithium ion, a sodium ion or a potassium ion.

8. The coloring composition according to claim 1, wherein the compound represented by Formula (1) is contained in an amount of 1% by mass to 20% by mass.

9. An ink for inkjet recording comprising the coloring composition according to claim 1.

10. An inkjet recording method comprising forming an image by using the coloring composition according to claim 1.

11. An inkjet recording method comprising forming an image by using the ink for inkjet recording according to claim 9.

12. A compound represented by Formula (1):

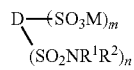

Formula (1)

wherein D represents a residue structure in which four hydrogen atoms are removed from the compound represented by Formula (2), $R^1$ and $R^2$ represent $R^1=R^2=H$, or $R^1=R$ and $R^2=-L-CO_2M$, R represents a hydrogen atom or a monovalent substituent, and when a plurality of R is present, R's may be the same or different, L represents a divalent linking group, and when a plurality of L is present, L's may be the same or different, M represents a hydrogen atom or a counteraction, and when a plurality of M is present, M's may be the same or different, and n represents the number of 1 to 4, and m represents the number of 0 to 3, provided that m+n is 4:

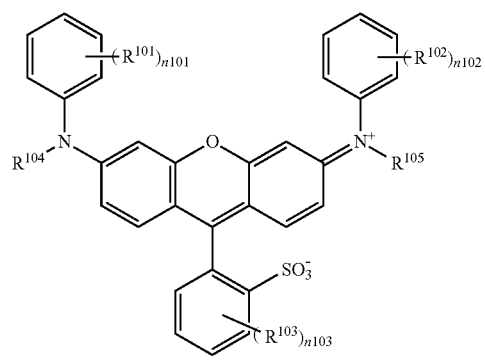

Formula (2)

wherein $R^{101}$, $R^{102}$ and $R^{103}$ each independently represent a monovalent substituent, $R^{104}$ and $R^{105}$ each independently represent a hydrogen atom or a monovalent substituent, and $n^{101}$ and $n^{102}$ each independently represent the number of 0 to 5, and $n^{103}$ represents 0 to 4 and when $n^{101}$, $n^{102}$ and $n^{103}$ each represent the number of 2 or more, each of pluralities of $R^{101}$, $R^{102}$ and $R^{103}$ may be the same or different.

* * * * *